(12) United States Patent
Hashimoto et al.

(10) Patent No.: US 7,019,817 B2
(45) Date of Patent: Mar. 28, 2006

(54) EDGE-HOLDING ALIGNER

(75) Inventors: Yasuhiko Hashimoto, Kobe (JP);
Yasuo Hirooka, Akashi (JP); Takao Yamaguchi, Tojiyo-Cho (JP); Hiroshi Kanda, Akashi (JP)

(73) Assignee: Kawasaki Jukogyo Kabuishiki Kaisha, Kobe (JP)

( * ) Notice: Subject to any disclaimer, the term of this patent is extended or adjusted under 35 U.S.C. 154(b) by 29 days.

(21) Appl. No.: 10/884,989

(22) Filed: Jul. 7, 2004

(65) Prior Publication Data
US 2005/0110974 A1 May 26, 2005

(30) Foreign Application Priority Data
Jul. 14, 2003 (JP) ............................. 2003-274370
Jul. 14, 2003 (JP) ............................. 2003-274372

(51) Int. Cl.
G03B 27/58 (2006.01)
G03B 27/62 (2006.01)
(52) U.S. Cl. .......................................... 355/72; 355/75
(58) Field of Classification Search ................. 355/53, 355/67, 72, 75; 356/375; 414/783, 936, 414/941
See application file for complete search history.

(56) References Cited

U.S. PATENT DOCUMENTS

| 5,982,474 A | * | 11/1999 | Akiyama et al. | ............. 355/53 |
| 2003/0053904 A1 | * | 3/2003 | Kirihata et al. | ............. 414/783 |
| 2003/0180127 A1 | * | 9/2003 | Kuroda | ..................... 414/217 |

FOREIGN PATENT DOCUMENTS

JP A 2002-151577 5/2002

* cited by examiner

Primary Examiner—Henry Hung Nguyen
(74) Attorney, Agent, or Firm—Oliff & Berridge, PLC

(57) ABSTRACT

The angular position of a notch (17) is determined on the basis of data provided by second notch detectors (24a) and (24b) and an encoder (25). A controller (38) turns a rotational arm (22) for angular displacement such that holders (26) and (27) are displaced in a circumferential direction B from the notch (17), and then the holders (26) and (27) hold a wafer (19). Since the holders (26) and (27) are in touch with edges in which the notch (17) is not formed, the first notch detector (23) is able to detect the notch (17) without difficulty. Thus the position of the wafer (19) relative to the rotational arm (22) does not need to be changed several times depending on positions at which the holders (26) and (27) hold the wafer (19), which is necessary in the prior technology. The aligner (20) touches parts, not including the notch (17), of the wafer (19) and is capable of adjusting the position of the wafer (19) in a short time.

13 Claims, 27 Drawing Sheets

EDGE-HOLDING ALIGNER

BACKGROUND OF THE INVENTION

1. Field of the Invention

The present invention relates to an edge-holding aligner capable of holding an edge of a substrate and turning the substrate to adjust the position of the substrate.

2. Description of the Related Art

A disk-shaped substrate, such as a semiconductor wafer, has an orientation indicator, such as a notch or an orientation flat, for indicating a reference position in a circumferential direction. The notch is a V-shaped indentation cut in the edge of the substrate. The orientation flat is a chord formed by cutting a segment from a peripheral part of the substrate.

When the substrate is subjected to a surface treatment, such as when the semiconductor wafer is subjected to a gate forming process, the substrate needs to be set on a processing stage with the angular position of its orientation indicator coincided with a predetermined reference angular position.

Generally, a plurality of substrates are held in a vertical stack in a cassette with their orientation indicators positioned randomly. A substrate carrying device carries the substrate from the cassette to an aligner. The aligner holds the substrate carried thereto with the orientation indicator of the substrate positioned at the predetermined reference angular position. Then, the substrate carrying device carries the substrate thus positioned by the aligner to a processing stage and places the substrate on the processing stage so that the angular position of the orientation indicator of the substrate coincides with a reference angular position. A prior edge-holding aligner capable of supporting an edge of a substrate and of adjusting the position of the substrate is disclosed in JP-A No. 2002-151577.

The edge holding aligner disclosed in the above-mentioned patent publication carries a substrate to a rotary holder by a robot hand. The aligner detects a notch in the substrate while the substrate is turned one full turn by the rotary holder, adjusts the angular position of the substrate so that the notch coincides with a reference angular position for the positional adjustment of the substrate.

Then, a lifting holder holds the positioned substrate and lifts up the substrate from the rotary holder. Then, the robot hand takes the substrate held by the lifting holder out of the aligner.

In the edge-holding aligner disclosed in the above-mentioned patent publication, the rotary holder comes into contact with the edge of the substrate to hold the substrate. If the notch lies in an edge region in contact with the rotary holder, the notch cannot be properly detected.

In such a case, the substrate held by the rotary holder needs to be shifted from the rotary holder to the lifting holder or the robot hand. The rotary holder is turned through an angle after shifting the substrate to the lifting holder or the robot hand, the substrate is reloaded on the rotary holder, and a notch detecting operation needs to be repeated. Such a position adjusting procedure using the prior aligner takes much time.

The edge-holding aligner disclosed in the above-mentioned patent publication needs to transfer the substrate from the rotary holder to the lifting holder after the completion of the positional adjustment of the substrate, and the robot hand receives the substrate from the lifting holder. Thus, a transfer operation for transferring the substrate from the rotary holder to the lifting holder is indispensable. There is a high possibility that the thus correctly positioned substrate is dislocated during the transfer operation. The transfer operation increases time necessary for the positioning operations including a feed operation for feeding the substrate to the aligner and a delivery operation for carrying away the positioned substrate.

Accordingly, it is an object of the present invention to provide an edge-holding aligner capable of holding the substrate at an edge region where an orientation indicator is not formed and of completing the positional adjustment of the substrate in a short time.

Another object of the present invention to provide an edge-holding aligner capable of widening a range in which a substrate can be transferred from the edge-holding aligner to a substrate carrying device without shifting the substrate.

SUMMARY OF THE INVENTION

According to the first aspect of the present invention, an edge-holding aligner for detecting an orientation indicator formed in an edge of a disk-shaped substrate, adjusting a position of the substrate based on a detection result of the orientation indicator, and then holding the substrate, includes:

a base;

a rotational arm supported on the base so as to be able to turn for angular displacement about a predetermined pivotal axis, the rotational arm being provided with a holder for holding an edge of the substrate in a state that an axis of the substrate is aligned with the pivotal axis;

rotational arm driving means for driving the rotational arm for angular displacement about the pivotal axis;

holder driving means for driving the holder for radial displacement along a radius of an imaginary circle having a center on the pivotal axis;

first orientation indicator detecting means for detecting the orientation indicator, the first orientation indicator detecting means being mounted on the base so as to correspond to a path along which the edge of the substrate moves;

second orientation indicator detecting means for detecting the orientation indicator, the second orientation indicator detecting means being mounted on the rotational arm so as to correspond to a path along which the edge of the substrate moves;

angular position detecting means for detecting an angular position of the rotational arm about the pivotal axis; and control means for controlling the rotational arm driving means to turn the rotational arm for angular displacement, determining a position of the orientation indicator based on detected data provided by the second orientation indicator detecting means and the angular position detecting means while the rotational arm is being turned for angular displacement, controlling the rotational arm driving means to turn the rotational arm through an angle such that the holder and the orientation indicator are displaced circumferentially relative to each other.

In the edge-holding aligner according to the present invention, the control means controls, in a state that the orientation indicator is positioned at a predetermined reference angular position, the rotational arm driving means to turn the rotational arm for angular displacement before the holder holds the substrate such that the rotational arm is positioned at a position in a transfer-permissible range in which the substrate can be transferred to another substrate carrying device and vice versa.

The edge-holding aligner according to the present invention further includes: a shifting arm provided with a shifter for receiving the substrate from the holder and returning the substrate to the holder so as to permit the rotational arm to turn for angular displacement after the substrate has been transferred from the holder to the shifter; and shifting arm driving means for driving the shifting arm to displace.

In the edge-holding aligner according to the present invention, the control means controls, in a state that the orientation indicator is positioned at a predetermined reference angular position, the rotational arm driving means to turn the rotational arm for angular displacement before the holder holds the substrate such that the rotational arm is positioned at a position in a noninterference range in which the rotational arm does not interfere with the shifting arm.

In the edge-holding aligner according to the present invention, the rotational arm is provided with a plurality of holders, the holders being pressed against the substrate in diametrically opposite directions, respectively, to hold the substrate.

The edge-holding aligner according to the present invention further includes positional difference calculating means for calculating a positional difference of the substrate from a predetermined position based on the position of the orientation indicator detected by the first orientation indicator detecting means and the second orientation indicator detecting means.

A substrate positioning system according to the present invention includes: the aforesaid edge-holding aligner; and
a substrate carrying device for carrying a substrate to the edge-holding aligner;
wherein the substrate carrying device corrects the position of the substrate based on the positional difference of the substrate calculated by the positional difference calculating means.

According to the second aspect of the present invention, an edge-holding aligner for detecting an orientation indicator formed in an edge of a disk-shaped substrate, adjusting a position of the substrate based on a detected result of the orientation indicator, and then holding the substrate, includes:
a base;
a rotational arm supported on the base so as to be able to turn for angular displacement about a predetermined pivotal axis, the rotational arm being provided with two holders disposed point-symmetrically with respect to the pivotal axis and capable of supporting an edge of the substrate from one direction along thickness of the substrate in a state that an axis of the substrate is aligned with the pivotal axis;
rotational arm driving means for driving the rotational arm for angular displacement about the pivotal axis;
holder driving means for driving the holders for radial displacement along radii of an imaginary circle having a center on the pivotal axis;
first orientation indicator detecting means for detecting the orientation indicator, the first orientation indicator detecting means being mounted on the base so as to correspond to a path along which the edge of the substrate moves;
angular position detecting means for detecting an angular position of the rotational arm about the pivotal axis;
a shifting arm provided with a shifter for receiving the substrate from the holders and returning the substrate to the holders so as to permit the rotational arm to turn for angular displacement after the substrate has been transferred from the holders to the shifter; and
shifting arm driving means for driving the shifting arm to displace.

In the edge-holding aligner according to the present invention, the holders come into contact with the substrate on opposite sides of an imaginary plane containing the pivotal axis, respectively, and hold the substrate cooperatively between the holders.

In the edge-holding aligner according to the present invention, a plurality of shifters are provided so that the shifters cooperatively hold the substrate between the shifters.

In the edge-holding aligner according to the present invention, the shifting arm turns for angular displacement about an axis of angular displacement perpendicular to the pivotal axis, and a straight line connecting a position where the shifter is in touch with the edge of the substrate and the axis of angular displacement in an imaginary plane perpendicular to the axis of angular displacement is parallel to the pivotal axis.

In the edge-holding aligner according to the present invention, the shifting arm driving means includes pneumatic cylinders which are operated coordinately by compressed air supplied from a single compressed air source.

In the edge-holding aligner according to the present invention, the rotational arm is turned through an angle based on the orientation indicator and a shape of the substrate carrying device for carrying the substrate to hold the substrate at an angular position such that frequency of shifting operation for shifting the substrate by the shifting arms is made small.

In the edge-holding aligner in the first aspect of the present invention, after the substrate is aligned with the pivotal axis, the rotational arm is turned for angular displacement before the substrate is held. The second orientation indicator detecting means for detecting the orientation indicator move for angular displacement about the pivotal axis along the edge of the substrate. The control means determines the angular position of the orientation indicator on the basis of data provided by the second orientation indicator detecting means and the angular position detecting means. If the orientation indicator is in an edge region opposed to a path along which the second orientation indicator detecting means moves, the control means turns the rotational arm such that the holder and the orientation indicator are separated circumferentially from each other. The holder comes into contact with an edge of the substrate not including the orientation indicator to hold the substrate. If the orientation indicator is not in an edge region opposed to the path along which the second orientation indicator detecting means moves, the control means makes the holder come into contact with an edge opposed to the path of the second orientation indicator detecting means.

The rotational arm is turned for angular displacement after the holder has been brought into contact with the edge not including the orientation indicator and the substrate has been held by the holder. The angular position of the orientation indicator is determined on the basis of data provided by the first orientation indicator detecting means and the angular position detecting means in a period for the angular displacement. Then the rotational arm is turned for angular displacement so that the orientation indicator is located at a reference angular position.

Since the orientation indicator is not formed in the edge in contact with the holder, the first orientation indicator detecting means is able to detect the orientation indicator easily without being obstructed by the holder. In other words, the angular position of the orientation indicator can be exactly determined simply by turning the rotational arm one full turn at the maximum. Since the orientation indicator is in an edge other than the edge in contact with the holder, the position of the substrate relative to the rotational arm does not need to be changed several times depending on a position at which the holder holds the substrate, which is necessary in the prior technology, and the substrate does not need to be turned more than one full turn. Consequently, time necessary for detecting the orientation indicator can be reduced and a position adjusting procedure for the positional adjustment of the substrate can be achieved in a short time.

According to the present invention, if the orientation indicator is in an edge region opposed to the path of the second orientation indicator detecting means, the substrate is held after turning the rotational arm for angular displacement such that the rotational arm is located in a substrate transferable region with the orientation indicator located at the reference angular position. Thus interference between the rotational arm and the substrate carrying device can be avoided, and the substrate can be transferred to the substrate carrying device.

Thus interference between the substrate carrying device and the rotational arm can be avoided before the orientation indicator is located at the reference angular position. The substrate needs to be shifted and held again if the rotational arm interferes with the substrate carrying device. Since the present invention prevents such interference, time necessary for shifting the substrate can be reduced and the positional adjustment of the substrate can be achieved in a short time.

According to the present invention, the shifting arm receives the substrate from the rotational arm and the rotational arm holds the substrate again after the rotational arm has been turned for angular displacement if the rotational arm interferes with the substrate carrying device in a state where the orientation indicator is located at the reference angular position. Thus the positional relation between the rotational arm and the substrate carrying device is adjusted so that the rotational arm may not interfere with the substrate carrying device in a state where the orientation indicator is located at the reference angular position. Consequently, the substrate undergone positional adjustment can be carried by the substrate carrying device even if the orientation indicator is at any position on the edge of the substrate.

According to the present invention, the substrate is held after turning the rotational arm for angular displacement such that the rotational arm is located in a noninterference range with the orientation indicator positioned at the reference angular position when the orientation indicator is in an edge region opposed to the path of the second orientation indicator detecting means. Thus interference between the rotational arm and the shifting arm can be prevented before the orientation indicator is located at the reference angular position. Consequently, the frequency of the transfer operation for transferring the substrate from the rotational arm to the shifting arm can be reduced.

If the rotational arm and the shifting arm interfere with each other, the frequency of the transfer operation increases. The present invention can reduce the frequency of the transfer operation by preventing interference between the rotational arm and the shifting arm.

According to the present invention, the holders come into contact with the substrate from diametrically opposite directions, respectively, to hold the substrate, so that the substrate is prevented from being displaced relative to the rotational arm when the substrate is turned about the pivotal axis and positioning accuracy can be improved. The substrate thus held can be turned for angular displacement at an angular velocity higher than that at which a substrate is supported from below can be turned. Consequently, the positioning operation can be completed in a short time.

According to the present invention, the positional deviation of the substrate can be calculated on the basis of date provided by the first and the second orientation indicator detecting means and the incorrect disposition of the substrate can be determined. A signal indicating an abnormal state is generated when the positional deviation is large to stop the position adjusting procedure and, consequently, the substrate and the edge-holding aligner can be prevented from being damaged.

According to the present invention, the substrate carrying device is capable of correcting the positional deviation of the substrate. Therefore, an accurate substrate position does not need to be specified and hence teaching time can be reduced.

The edge-holding aligner in the second aspect of the present invention is provided with the two holders disposed point-symmetrically with respect to the pivotal axis. Thereby, the interval between the holders can be increased, a range permitting the transfer of the substrate from the rotational arm to the substrate carrying device without transferring the substrate from the rotational arm to another holder can be expanded. Possibility of the thus correctly positioned substrate being dislocated during the transfer operation can be reduced by transferring the substrate from the rotational arm to the substrate carrying device without transferring the substrate from the rotational arm to another holder.

According to the present invention, the substrate can be stably held by the two holders that come into contact with the substrate on the opposite sides of the imaginary plane. The substrate can be more securely held by pressing the holders against the substrate in opposite directions, respectively. Thus the substrate can be prevented from coming off the holders even when the rotational arm is turned for angular displacement with the substrate held by the two holders.

According to the present invention, the substrate can be more securely held by pressing the holders against the substrate in opposite directions, respectively. Thus the substrate is restrained from changing its position when the substrate is transferred from the holders to the shifter.

According to the present invention, the straight line connecting a position where the shifter of the shifting arm is in touch with the edge of the substrate and the axis of angular displacement is parallel to the pivotal axis. In other words, the straight line extends perpendicularly to one of the surfaces with respect to a direction parallel to the axis of the substrate. A torque about the axis of angular displacement acts on the shifter to press the edge toward the pivotal axis. The straight line connecting the axis of angular displacement and the shifter is parallel to the pivotal axis. Therefore, the shifter applies only a radial force to the substrate. Consequently, the shifter is able to hold the substrate securely without damaging the substrate and without applying any force to the substrate in a direction along the thickness of the substrate.

According to the present invention, the pneumatic cylinders are operated coordinately by compressed air supplied from the single compressed air source. Therefore, none of the plurality of shifters apply an excessively high pressure to the substrate, pressures applied by the shifters are balanced and hence the substrate can be held substantially at a fixed position.

According to the present invention, the orientation indicator can be detected and the substrate can be transferred to the substrate holding device by the least necessary frequency of the shifting operation, for example, without executing the shifting operation or with executing the shifting operation once, on the basis of the orientation indicator of the substrate and the shape of the substrate carrying device when the shifting arm shifts the substrate. Consequently, the frequency of the shifting operation can be reduced and the positioning operation can be completed in a short time.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
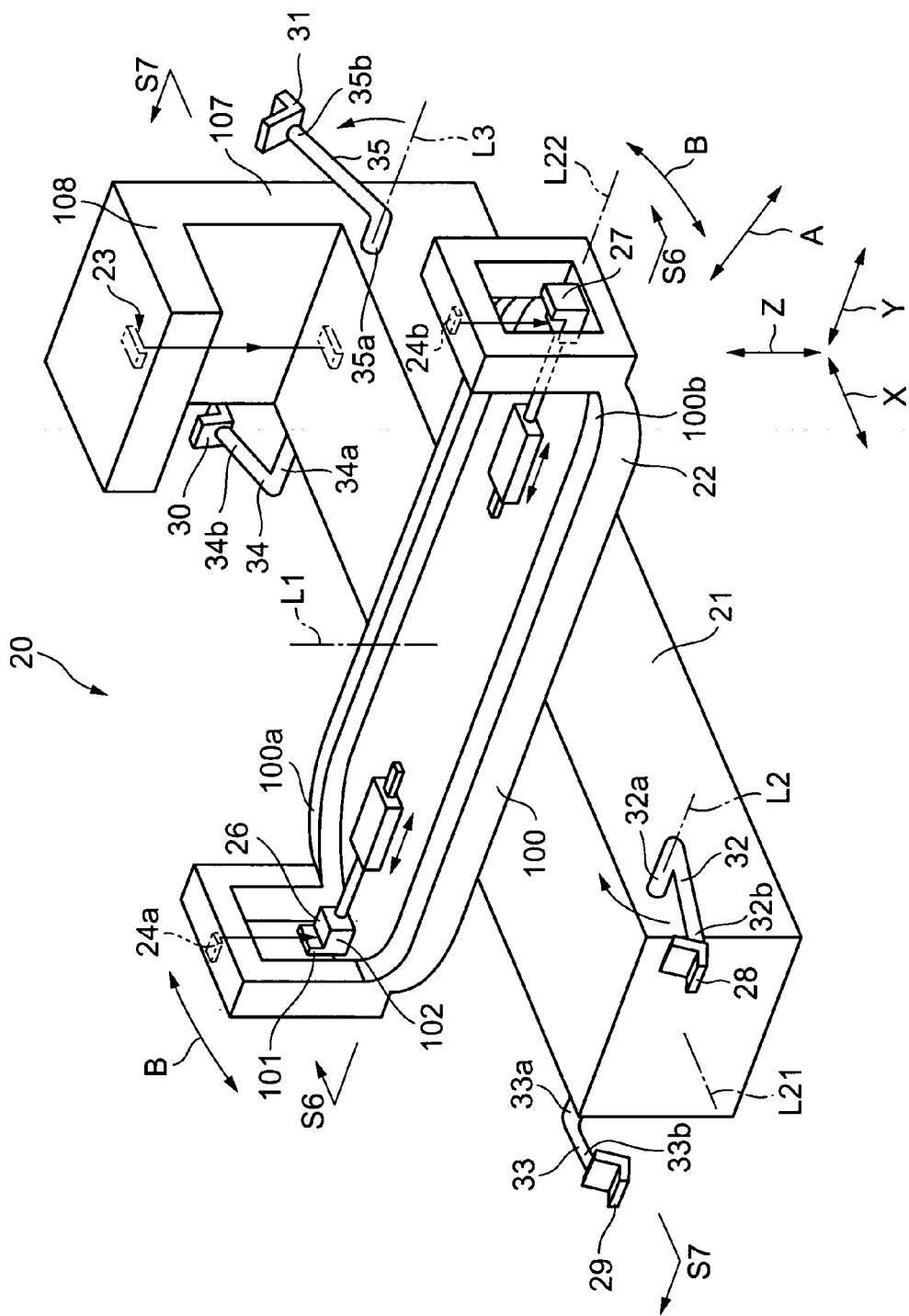
FIG. 1 is a typical perspective view of an edge-holding aligner 20 in a preferred embodiment according to the present invention.
Figure 2:
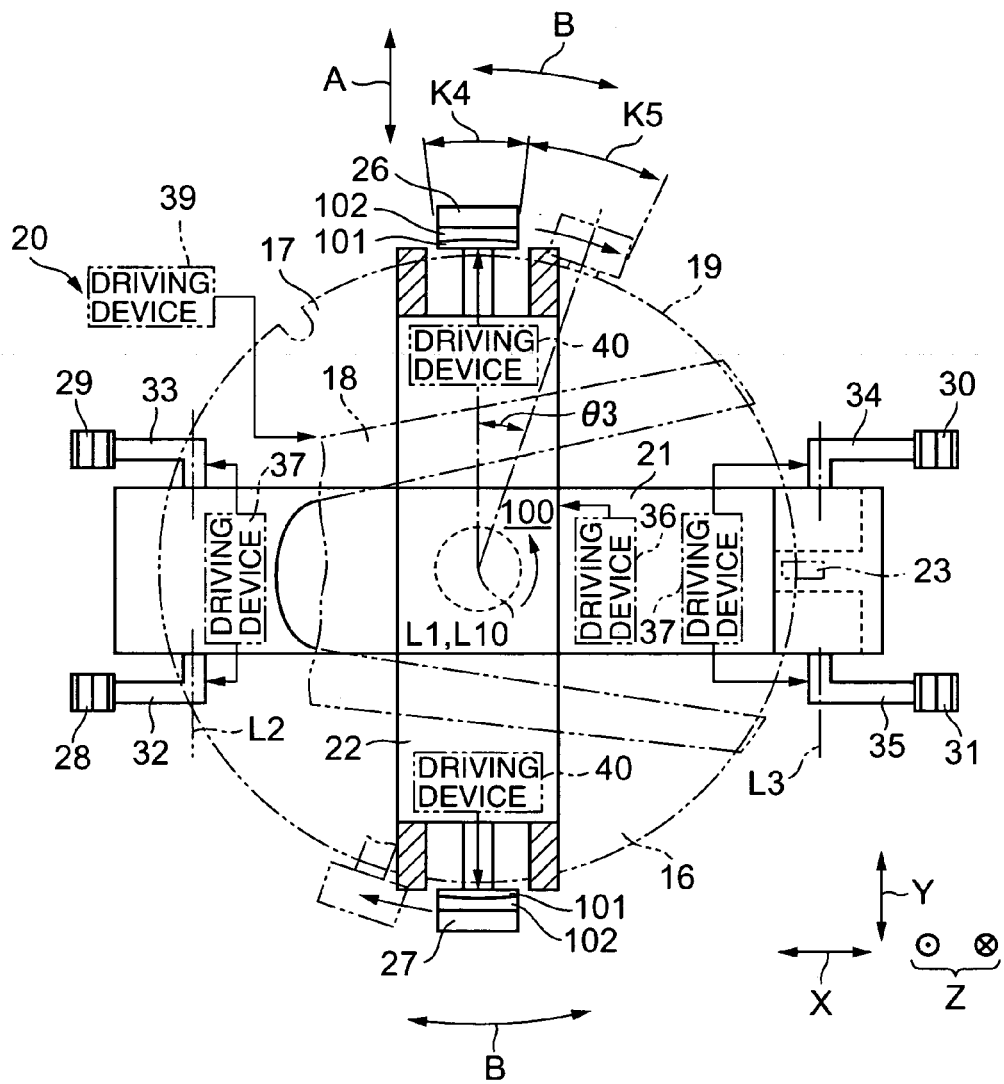
FIG. 2 is a plan view with certain parts omitted of the edge-holding aligner 20.

FIG. 1 is a typical perspective view of an edge-holding aligner 20 in a preferred embodiment according to the present invention and FIG. 2 is a plan view with certain parts omitted of the edge-holding aligner 20. In some of the accompanying drawings some parts are omitted or simplified to facilitate understanding.

An edge-holding aligner 20 (hereinafter, referred to simply as "aligner 20") determines the angular position of a notch 17 formed in the edge 16 of a semiconductor wafer 19 and adjusts the position of the wafer 19 on the basis of the angular position of the notch 17. The notch 17 is an orientation indicator for use in adjusting the position of the wafer 19. The notch 17 is a V-shaped cut in the edge of the wafer 19.

The wafer 19 is carried to the aligner 20 by a robot hand 18, namely, a substrate carrying device. The robot hand 18 comes into contact with the wafer 19 from below the wafer 19 to support the wafer 19 thereof for carrying. The robot hand 18 is formed, for example, in a Y-shape to support the wafer 19 at three or more edges at different circumferential positions along a circumferential direction B. The robot hand 18 is provided with movable shifters capable of shifting the wafer 19 in radial directions A, and a fixed shifter. Plungers press the movable shifters to hold the wafer 19 by the movable shifters and the fixed shifter.

The aligner 20 receives the wafer 19 from the robot hand 18, and holds the wafer 19 after adjusting the position of the wafer 19. The robot hand 18 takes up the properly positioned wafer 19 from the aligner 20 and carries the properly positioned wafer 19.

The aligner 20 includes a base 21, a rotational arm 22, a first notch detector 23, second notch detectors 24a and 24b, and shifting arms 32 to 35. The base 21 extends along a predetermined base axis L21 and has a shape substantially resembling a long rectangular parallelepiped. The base axis L21 is perpendicular to a pivotal axis L1. The base 21 having the shape substantially resembling a rectangular parallelepiped has a length along an X-axis, a width along a Y-axis and a height along a Z-axis. The X-, the Y- and the Z-axis are perpendicular to each other. The base 21 is a hollow member having an interior space 46.

The rotational arm 22 is a long member extending along an arm axis L22. The rotational arm 22 is supported on the base 21 so as to be turnable about the pivotal axis L1 for angular displacement. In this embodiment, the pivotal axis L1 is vertical, and the arm axis L22 is perpendicular to the pivotal axis L1.

The rotational arm 22 holds the wafer 19 detachably with the axis L10 of the wafer 19 aligned with the pivotal axis L1. The rotational arm 22 turns the wafer 19 held thereon about the pivotal axis L1 for angular displacement. In the following description, a direction along a radius of the wafer 19 held on the rotational arm 22, i.e., a direction along a radius of an imaginary circle having its center on the pivotal axis L1, will be referred to as a radial direction A, and a direction along the circumference of the wafer 19 held on the rotational arm 22, i.e., a direction along the circumference of the imaginary circle, will be referred to as a circumferential direction B.

The rotational arm 22 includes a long arm body 100 extending along the arm axis L22, and holders 26 and 27 disposed, respectively, on the opposite end parts 100a and 100b of the arm body 100. The arm body 100 is perpendicular to the pivotal axis L1. The pivotal axis L1 penetrates the middle part of the arm body 100. When the rotational arm 22 turns about the pivotal axis L1 for angular displacement, the arm axis L22 turns about the pivotal axis L1 for angular displacement.

The holders 26 and 27 hold the wafer 19. The holders 26 and 27 are point-symmetrical with respect to the pivotal axis L1 in an imaginary plane perpendicular to the pivotal axis L1. The holders 26 and 27 are movable in radial directions A. The holders 26 and 27 are pressed against the edge of the wafer 19 in diametrically opposite directions, respectively, to hold the wafer 19 between the holders 26 and 27.

The first notch detector 23 is placed on the base 21. When the wafer 19 is held on the rotational arm 22 with its axis aligned with the pivotal axis L1, the first notch detector 23 corresponds to the edge 16 of the wafer 19 to detect the notch 17 of the wafer 19. The first notch detector 23 is the first orientation indicator detecting means.

The second notch detectors 24a and 24b, which, sometimes, will be inclusively designated by a reference character 24, are placed, respectively, on the opposite end parts 100a and 100b of the arm body 100 and turn together with the rotational arm 22 for angular displacement. The second notch detectors 24 correspond to the edge 16 of the wafer 19 held on the rotational arm 22 with its axis aligned with the pivotal axis L1 to detect the notch 17 formed in the edge 16. The second notch detectors 24a and 24b are the second orientation indicator detecting means. The first notch detector 23 and the second notch detectors 24a and 24b are photodetectors employing optical fibers.

The second notch detectors 24a and 24b may be fixedly mounted, respectively, on the holders 26 and 27. When the second notch detectors 24a and 24b are mounted on the holders 26 and 27, the second notch detectors 24a and 24b can be moved in the radial directions A together with the holders 26 and 27 to detect notches 17 respectively formed in wafers 19 of different sizes.

The shifting arms 32 to 35 are used to adjust the angular position of the wafer 19 relative to the rotational arm 22. The shifting arms 32 to 35 are able to hold the wafer 19 detachably. The shifting arms 32 to 35 holds the wafer 19 with its axis L10 aligned with the pivotal axis L1 at the same level as that at which the rotational arm 22 holds the wafer 19.

The shifting arms 32 to 35 have base end parts 32a to 35a pivotally supported on the base 21 such that outer end parts 32b to 35b are able to be moved toward and away from the wafer 19 held on the rotational arm 22. The shifting arms 32 and 33 and the shifting arms 34 and 35 are turnable, respectively, about axes L2 and L3. The shifting arms 32 to 35 are turned toward and away from the wafer 19 held by the holders 26 and 27 about the axes L2 and L3.

The axes L2 and L3 are included in a plane perpendicular to the pivotal axis L1. In this embodiment, the axes L2 and L3 are perpendicular to the base axis L21. The aligner 20 is provided with the four shifting arms 32 to 35. The aligner 20 needs to be provided with at least two shifting arms.

Shifters 28 to 31 are attached to the outer end parts 32b to 35b of the shifting arm 32 to 35 to hold the wafer 19. The shifters 28 to 31 hold the edge 16 of the wafer 19.

As shown in FIG. 2, the aligner 20 includes a rotational arm driving device 36 for driving the rotational arm 22 for turning about the pivotal axis L1, a holder driving device 40 for driving the holders 26 and 27 for movement in the radial directions A, and shifting arm driving devices 37 for driving the shifting arms 32 to 35 for turning about the axes L2 and L3, respectively. The robot hand 18 is driven for displacement by a robot hand driving device 39.

Figure 3:
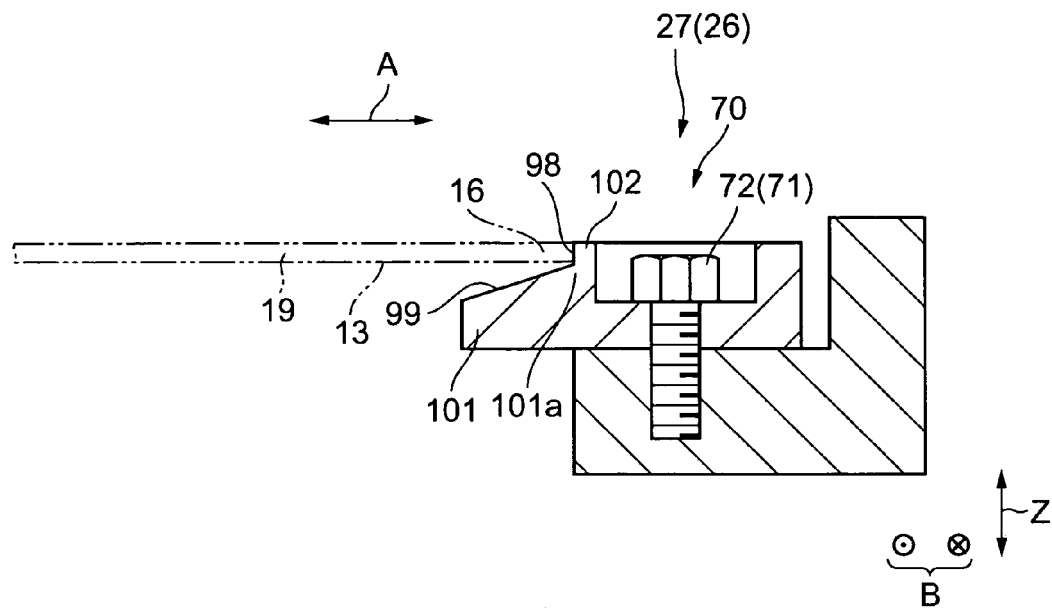
FIG. 3 is an enlarged sectional view in an imaginary plane perpendicular to a rotational axis L1 of a holder 26.
Figure 4:
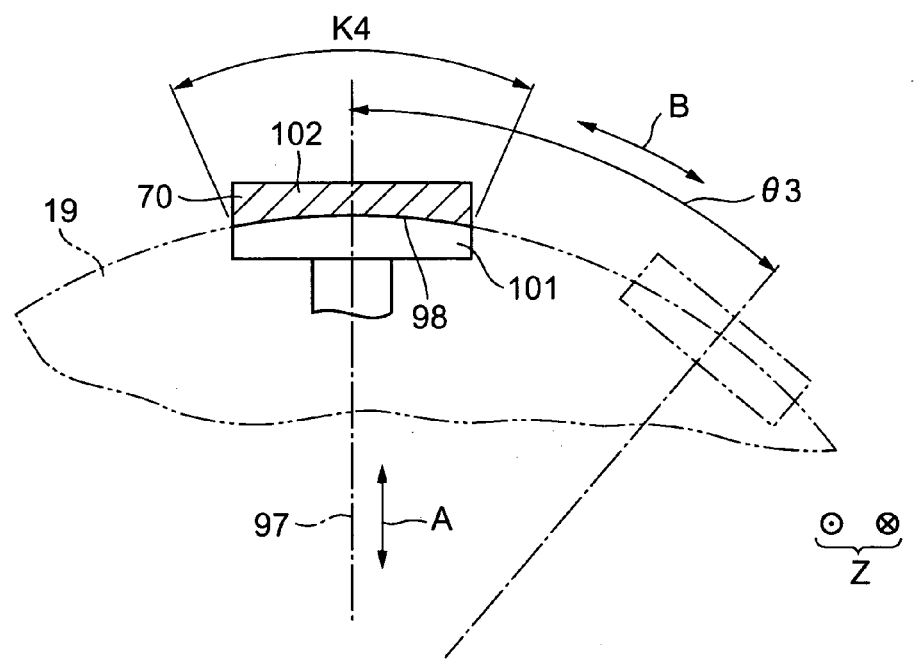
FIG. 4 is an enlarged plan view of the holder 26.

FIG. 3 is an enlarged sectional view in an imaginary plane perpendicular to the rotational axis L1 of the holder 26 and FIG. 4 is an enlarged plan view of the holder 26. Since the first holder 26 and the second holder 27 are identical, only the holder 26 will be described and the description of the other holder 27 will be omitted.

The holder 26 has a contact member 70. The contact member 70 has a support part 101 that comes into contact with one side of the wafer 19, for example, the lower surface of the wafer 19, to support the wafer 19 thereon, and a protruding part 102 rising from a radially outer end part 101a of the support part 101 in a direction Z1 parallel to height. The direction Z1 is a direction from the base 21 toward the rotational arm 22 parallel to the pivotal axis L1. In this embodiment, the direction Z1 is a vertically upward direction.

The support part 101 has a slope 99 declining in the inward radial direction A. When the wafer 19 is mounted on the holders 26 and 27, the lower surface 13 of the edge 16 comes into point contact with the support part 101.

Referring to FIG. 4, the protruding part 102 has a radially outwardly convex curved surface 98 that comes into contact with the edge 16. The radius of curvature of the curved surface 98 is approximately equal to the radius of the wafer 19. Thus the holders 26 and 27 come into surface contact with the edge 16 when the holders 26 and 27 are moved in the inward radial direction A.

The two holders 26 and 27 are moved in the inward radial directions A to bring the holders 26 and 27 into contact with the edge 16 of the wafer 19 disposed coaxially with the pivotal axis L1, so that the wafer 19 is held between the holders 26 and 17. The two holders 26 and 27 are moved outward radial directions A to release the wafer 19 from the holders 26 and 27.

Since the two holders 26 and 27 are point-symmetrical with respect to the pivotal axis L1, the axis L10 of the wafer 19 will not be dislocated with respect to the pivotal axis L1 when the holders 26 and 17 are brought into surface contact with the edge 16 of the wafer 19. Thus the wafer 19 can be held between the holders 26 and 27 with its axis L10 aligned with the pivotal axis L1.

The contact members 70 are detachably fastened to component members of the holders 26 and 27 with screws 71 and 72, respectively. The fine adjustment of the positions of the contact members 70 with respect to the radial directions A is possible. Thus the respective positions of the contact members 70 of the holders 26 and 27 with respect to the radial directions A can be minutely adjusted to hold the wafer 19 precisely in alignment with the pivotal axis L1.

Figure 5:
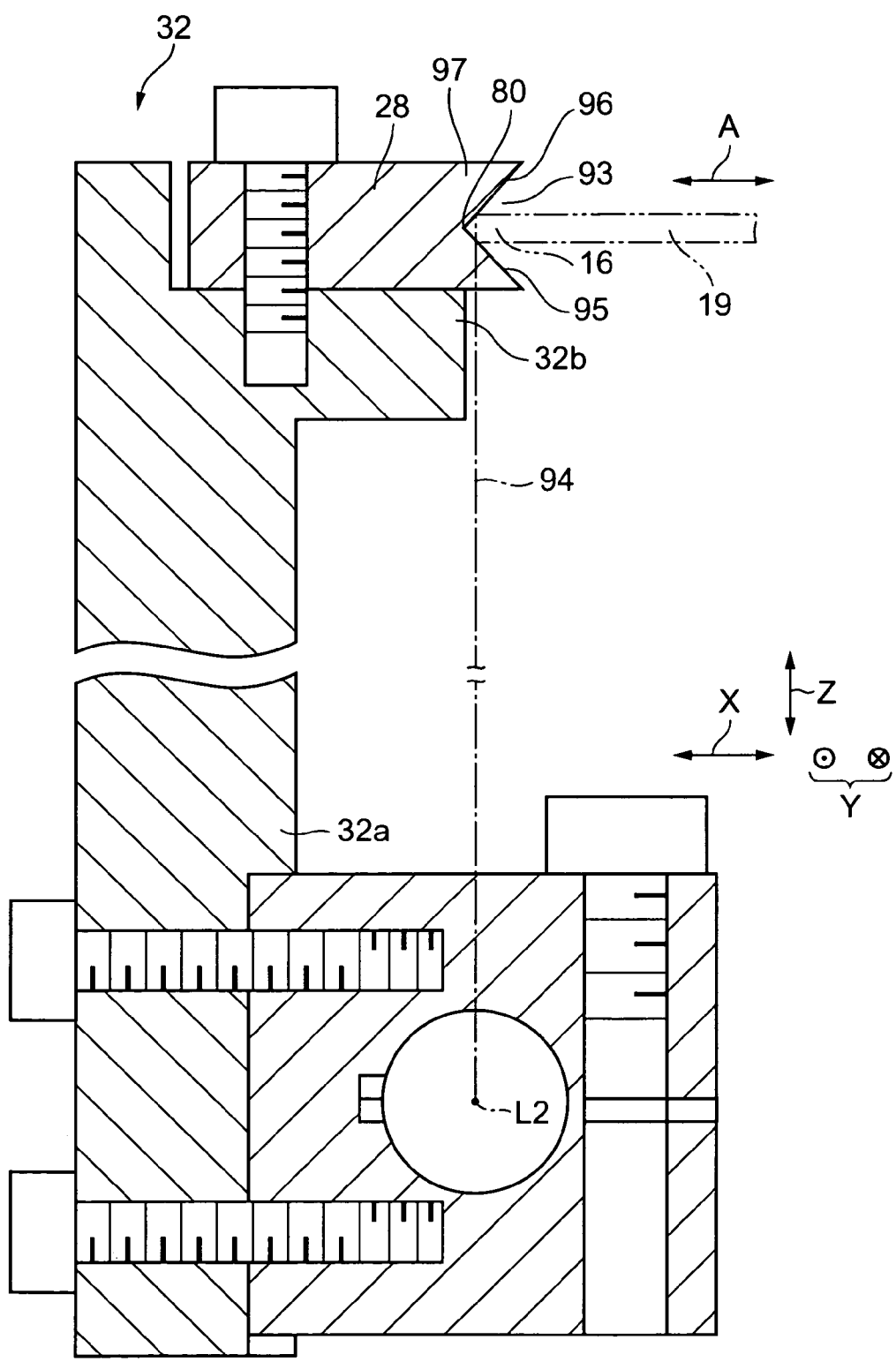
FIG. 5 is an enlarged sectional view in an imaginary plane containing the rotational axis L1 and a base axis L21 of a shifting arm 32.

FIG. 5 shows the shifting arm 32 in an enlarged sectional view in an imaginary plane containing the rotational axis L1 and the base axis L21. The shifting arms 32 to 35 are identical and hence only the shifting arm 32 will be described and the description of the rest will be omitted.

The shifter 28 has a holding part 97 for holding the edge 16 of the wafer 19. The holding part 97 is provided with a groove 93 that sinks in the outward radial direction A when the shifting arm 32 is moved to a holding position for holding the wafer 19. The holding part 97 has a first inclined contact surface 95 and a second inclined contact surface 96. When the shifting arm 32 is moved to the predetermined holding position, the first inclined contact surface 95 and the second inclined contact surface 96 are pressed against the wafer 19 and are depressed in opposite vertical directions Z, respectively.

The vertical position of the boundary between the first inclined contact surface 95 and the second inclined contact surface 96 coincides with that of a horizontal middle plane between the opposite surfaces of the wafer 19. Therefore, the wafer 19 can be shifted by the rotational arm 22 and the shifting arms 32 to 35 without vertically displacing the wafer 19.

The shifter 28 is attached to the outer end part 32b of the shifting arm 32. The base end part 32a of the shifting arm 32 is supported in a bearing on the base 21. The axis of the bearing is aligned with the axis L2 of turning of the shifting arm 32. The shifting arm 32 is able to turn about the axis L2 for angular displacement.

When the shifting arm 32 is turned to the holding position, a straight line 94 connecting the axis L2 of turning of the shifting arm 32 and a point of contact between the edge 16 and the shifter 28 in an imaginary plane containing the pivotal axis L1 and the base axis L21 is parallel to the pivotal axis L1. Even if the shifter 28 applies a pressure in the inward radial direction A to the wafer 19, any force do not act on the wafer 19 in directions of the thickness of the wafer 19.

When the shifting arm 32 is turned from the holding position in the outward radial direction A to a retracted position, the shifting arm 32 lies outside a region in which the rotational arm 22 turns for angular displacement. Consequently, the shifting arm 32 held at the retracted position does not obstruct the turning of the rotational arm 22.

The four shifting arms 32 to 35 are disposed at different positions with respect to the circumferential direction B. The first shifting arm 32 and the third shifting arm 34 are point-symmetrical with respect to the pivotal axis L1, and the second shifting arm 33 and the fourth shifting arm 35 are point-symmetrical with respect to the pivotal axis L1. Thus the shifting arms 32 to 35 are able to hold the wafer 19 without dislocating the axis L10 of the wafer 19 from the pivotal axis L1. The first shifting arm 32 and the third shifting arm 34 turn about the axis L2, and the second shifting arm 33 and the fourth shifting arm 35 turn about the axis L3.

Figure 6:
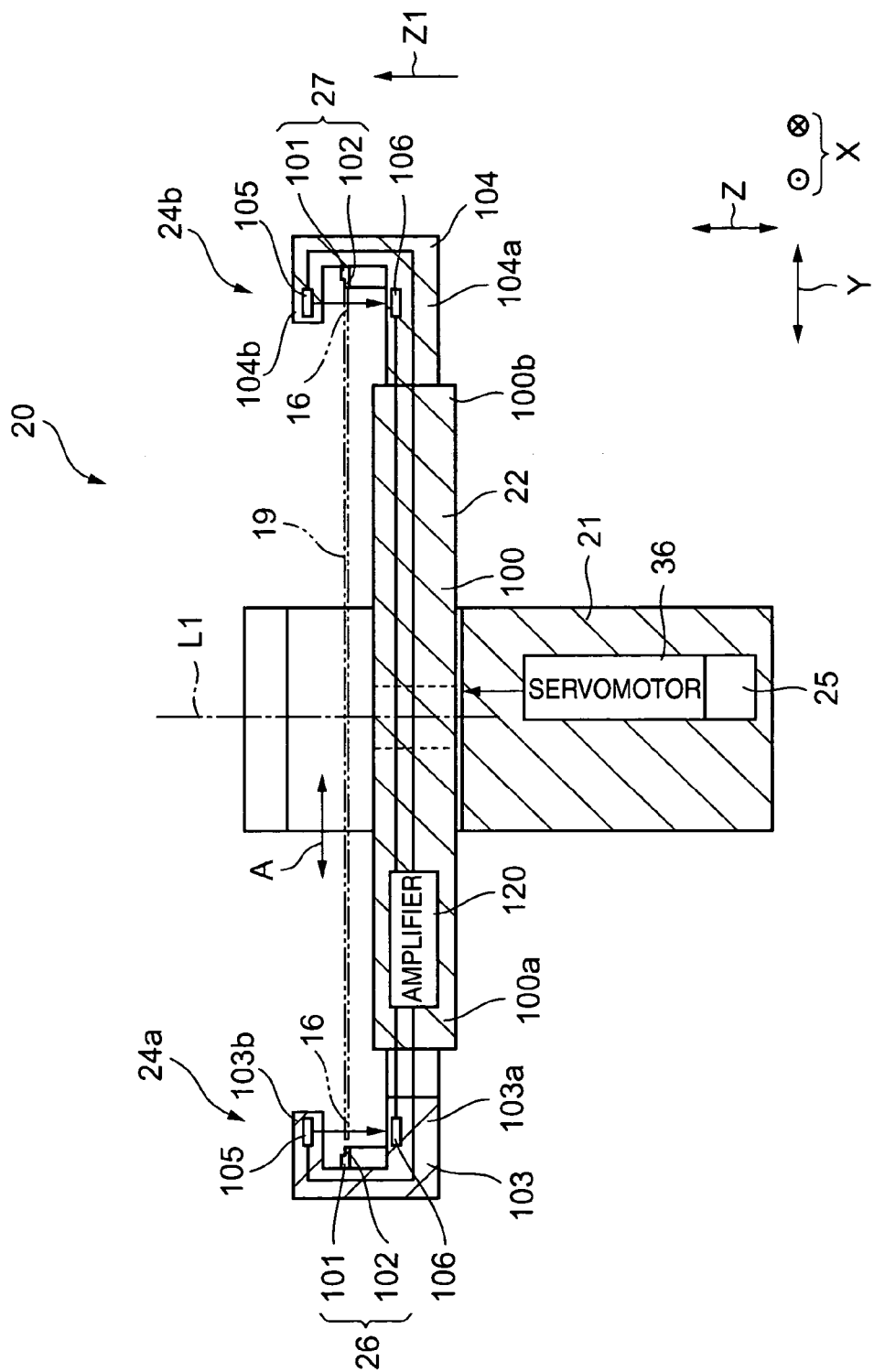
FIG. 6 is a sectional view taken on the line S6—S6 in FIG. 1 of the aligner 20.

FIG. 6 is a sectional view taken on the line S6—S6 in FIG. 1 of the aligner 20. The driving device 36, namely, a servomotor 36, drives the rotational arm 22 for turning about the pivotal axis L1 for angular displacement. The servomotor 36 is provided with a built-in encoder 25. The encoder 25 provides signals respectively corresponding to angular positions of the rotational arm 22. Thus the encoder 25 serves as an angular position sensor for measuring the angular position of the rotational arm 22 about the pivotal axis L1.

Two arm-side detectors 103 and 104 are incorporated, respectively, into the longitudinally opposite end parts 100a and 100b of the arm body 100. The arm-side detectors 103 and 104 have a substantially C-shaped section in an imaginary plane containing the pivotal axis L1 and the arm axis L22. First circumferential end parts 103a and 104a of the arm-side detectors 103 and 104 are on the side of the arm body 100.

Second circumferential end parts 103b and 104b of the arm-side detectors 103 and 104 rise from the first circumferential end parts 103a and 104a and are curved in the inward radial direction A. When the wafer 19 is disposed with its axis aligned with the pivotal axis L1, the edge 16 of the wafer 19 lies in a space between the first circumferential end part 103a and the second circumferential end part 103b and a space between the first circumferential end part 103b and the second circumferential end part 104b.

The arm-side detectors 103 and 104 are provided with built-in second notch detectors 24a and 24b, respectively. Each of the second notch detectors 24a and 24b has a light projector 105 and a light receiver 106. The light projectors 105 are built in the second circumferential end parts 103b and 104b of the arm-side detectors 103 and 104 to project light beams parallel to the pivotal axis L1 toward the first circumferential end parts 103a and 104a of the arm-side detectors 103 and 104, respectively. The light receivers 106 are built in the first circumferential end parts 103a and 104a to receive the light beams projected by the light projectors 105, respectively. For example, the light projectors 105 and the light receivers 106 are optical fibers. Use of optical fibers as the light projectors 105 and the light receivers 106 enables accurate detection of the notch.

When the light projectors 105 and the light receivers 106 are optical fibers, the arm body 100 is provided with a built-in optical fiber controller. For example, the optical fiber controller includes an optical amplifier 120. Each of the second notch detectors 24a and 24b decides whether or not the edge 16 lies between the light projector 105 and the light receiver 106 on the basis of the condition of the light receiver 106 which receives the light beam projected by the light projector 105.

Preferably, the optical amplifier 120 is disposed in an outer part of the arm body 100 with respect to the radial direction A. When the optical amplifier 120 is thus disposed, change in the quantity of light due to the bending of optical fiber cables can be reduced to achieve more accurate detection of the notch 17.

Figure 7:
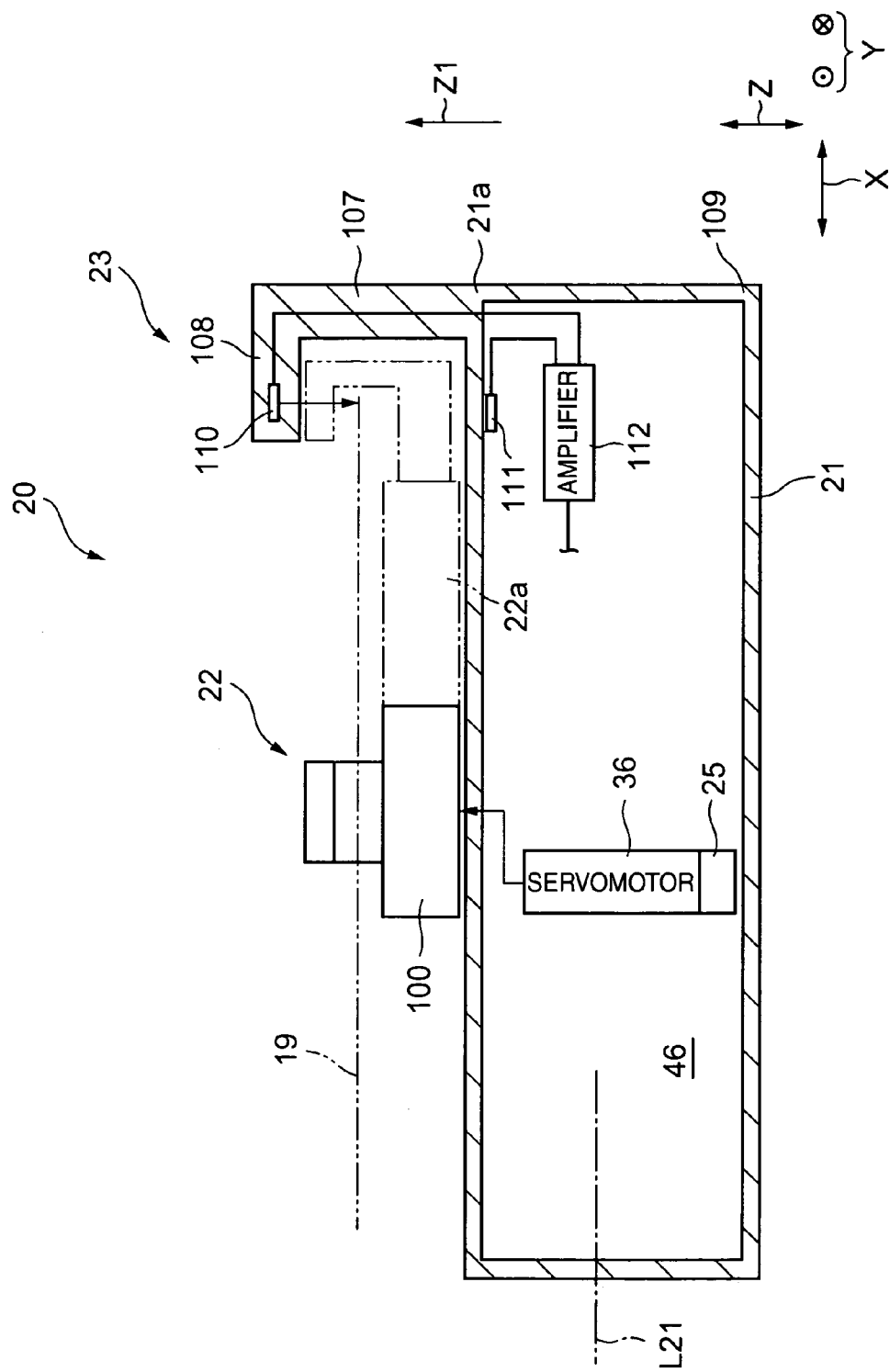
FIG. 7 is a sectional view taken on the line S7—S7 in FIG. 1 of the aligner 20.

FIG. 7 is a sectional view taken on the line S7—S7 in FIG. 1 of the aligner 20. The base 21 has a base body 109 extending along the base axis L21. A base-side detector 107 rises in the vertical direction Z1 from a longitudinal end part 21a of the base body 109. The base-side detector 107 is disposed so that the base-side detector 107 may not obstruct the angular displacement of the rotational arm 22. An upper part 107a of the base-side detector 107 is bent in the inward radial direction A to form a horizontal part 108. The edge 16 of the wafer 19 disposed coaxially with the pivotal axis L1 lies between the horizontal part 108 and the base body 109. The end parts of the rotational arm 22 are able to pass a space between the horizontal part 108 and the base body 109 when the rotational arm 22 is turned.

The base-side detector 107 is provided with the built-in first notch detector 23 including a light projector 110 and a light receiver 111. The light projector 110 is built in the horizontal part 108 to project a light beam parallel to the pivotal axis L1 toward the base body 109. The light receiver 111 is built in the base body 109 to receive the light beam projected by the light projector 110. For example, the light projector 110 and the light receiver 111 are optical fibers.

Use of optical fibers as the light projector 110 and the light receivers 111 enables accurate detection of the notch.

When the light projector 110 and the light receiver 111 are optical fibers, the base body 109 is provided with a built-in optical fiber controller. For example, the optical fiber controller includes an optical amplifier 112. The first notch detector 23 decides whether or not the edge 16 lies between the light projector 110 and the light receiver 111 on the basis of the condition of the light receiver 111 which receives the light beam projected by the light projector 110.

Figure 8:
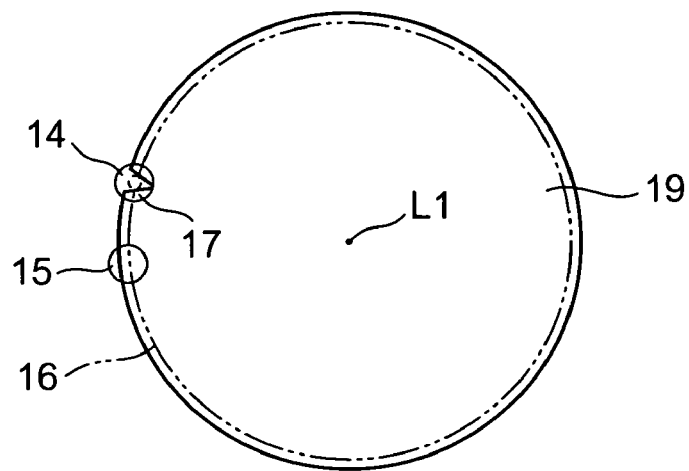
FIG. 8 is a plan view of a wafer 19 disposed with its axis L10 aligned with the rotational axis L1.
Figure 9:
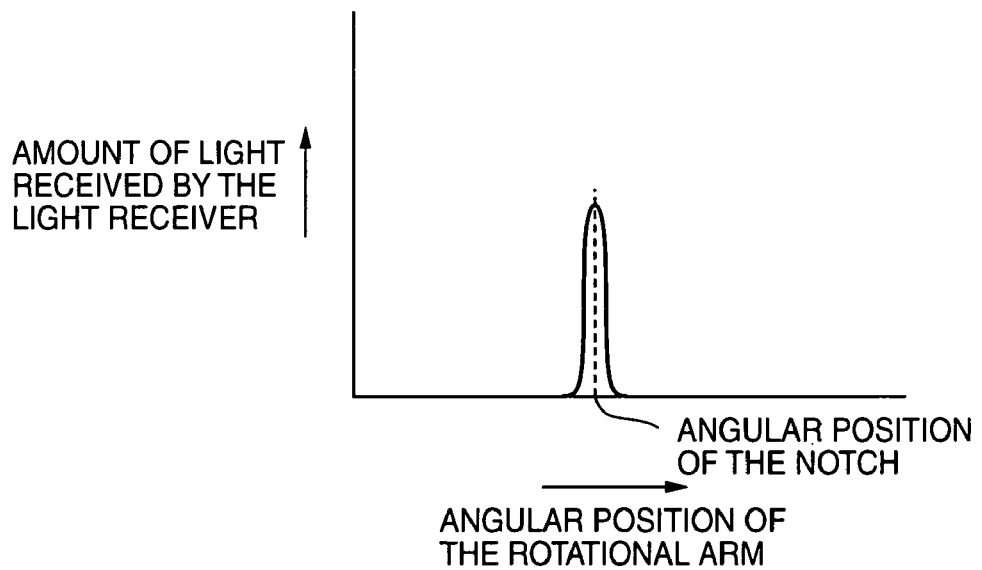
FIG. 9 is a graph showing the relation between the amount of light received by a light receiver and the angular position of a rotational arm.

FIG. 8 is a plan view of the wafer 19 disposed with its axis L10 aligned with the pivotal axis L1 and FIG. 9 is a graph showing the relation between the amount of light received by the light receiver 111 and the angular position of the rotational arm 22. The light projector 110 of the base-side detector 107 projects a light beam toward the edge 16 of the wafer 19 disposed coaxially with the pivotal axis L1. If the notch 17 does not coincide with the base-side detector 107 with respect to the circumferential direction, a light beam 15 projected by the light projector 110 is intercepted by the edge 16 and is unable to reach the light receiver 111. When the notch 17 is positioned opposite to the base-side detector 107 by turning the wafer 19 together with the rotational arm 22, a light beam 14 travels through the notch 17 and falls on the light receiver 111.

Thus, the light receiver 111 is able to receive the light beam projected by the light projector 110 when the notch 17 is positioned opposite to the base-side detector 107. The encoder 25 provides a signal representing an angular position of the rotational arm 22 at the reception of the light beam by the light receiver 111. Thus, the angular position of the notch 17 can be measured. A circle indicated by a two-dot chain line in FIG. 8 is a path along which the light beam 14 projected by the light projector 110 moves when the wafer 19 is turned for angular displacement. The first notch detector 23 is disposed in the base-side detector 107 such that part of or the entire light beam projected by the light projector 110 passes the notch 17.

Similarly, the notch 17 is positioned opposite to the arm-side detector 103 (104) shown in FIG. 6 when the light beam projected by the light projector 105 is received by the light receiver 106. The angular position of the notch 17 can be determined by measuring the angular position of the rotational arm 22 at a moment the light beam projected by the light projector 105 is received by the light receiver 106.

Figure 10:
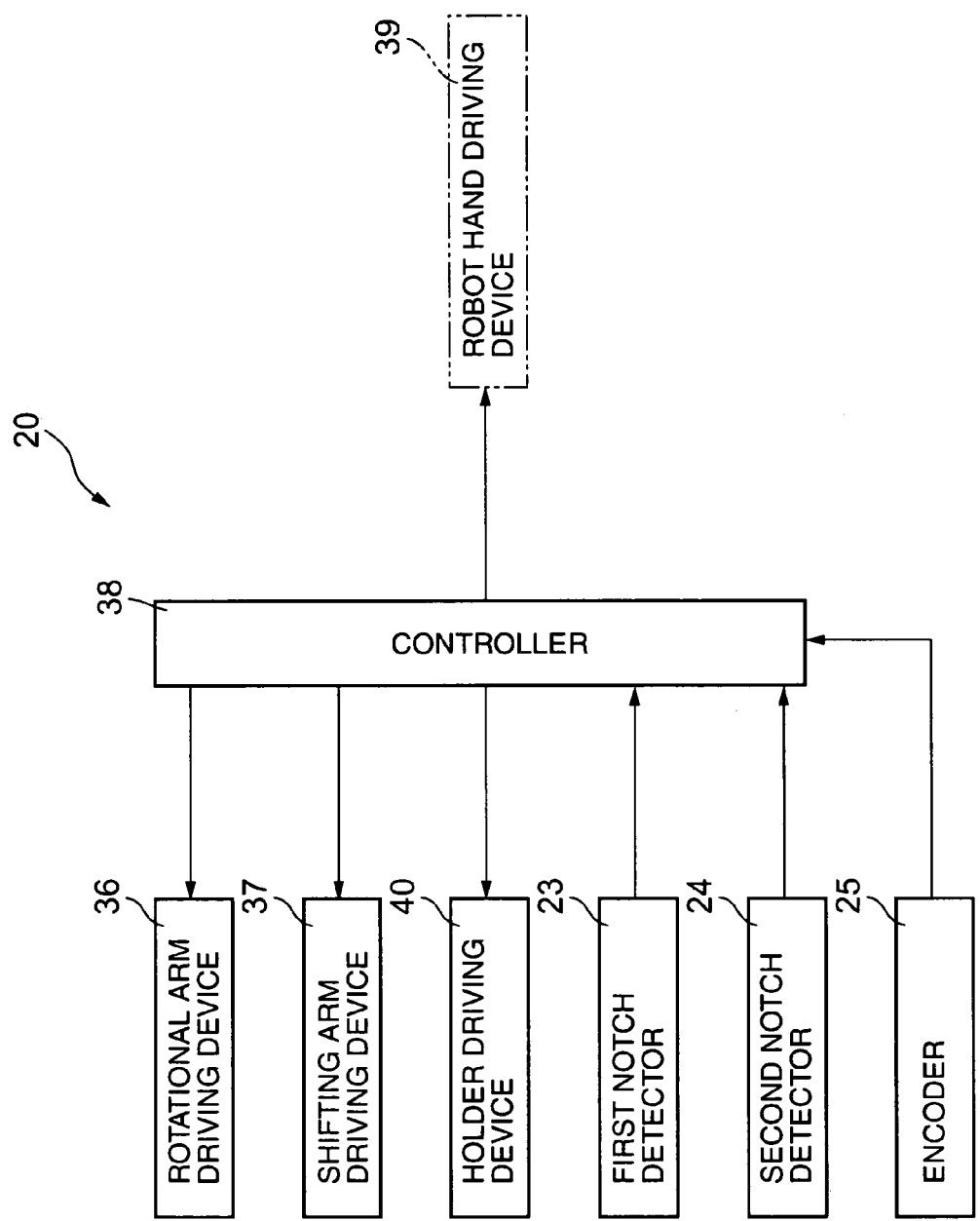
FIG. 10 is a block diagram of the electrical configuration of the aligner 20.

FIG. 10 is a block diagram of the electrical configuration of the aligner 20. The aligner 20 includes a controller 38. As mentioned above, the rotational arm driving device 36 drives the rotational arm 22 for angular displacement about the pivotal axis L1. The shifting arm driving devices 37 drive the shifting arms 32 to 35 for turning about the axes L2 and L3, respectively. The holder driving device 40 drives the holders 26 and 27 for movement in the radial directions A.

The encoder 25 measures the angular position of the rotational arm 22 and gives a signal representing the angular position of the rotational arm 22 to the controller 38. The first notch detector 23 and the second notch detectors 24a and 24b give signals representing the result of notch detecting operation for detecting the notch 17 to the controller 38. The controller 38 determines the angular position of the notch 17 on the basis of the signals provided by the notch detectors 23, 24a and 24b and the signal provided by the encoder 25. Then, the controller 38 controls the rotational arm driving device 36, the shifting arm driving devices 37 and the holder driving device 40 so that the notch 17 may be positioned at a predetermined reference angular position. In this embodiment, the controller may control the robot hand driving device 39 for driving the robot hand 18.

Practically, the controller 38 is a computer. For example, the controller 38 includes a storage device and an arithmetic unit. The storage device stores operation programs specifying operations, which will be explained later. The arithmetic unit executes the operation programs stored in the storage device to achieve the operations. The aligner 20 is provided with an alarm device that generates an alarm signal indicating an abnormal condition to inform the operator of an abnormal condition.

Figure 11:
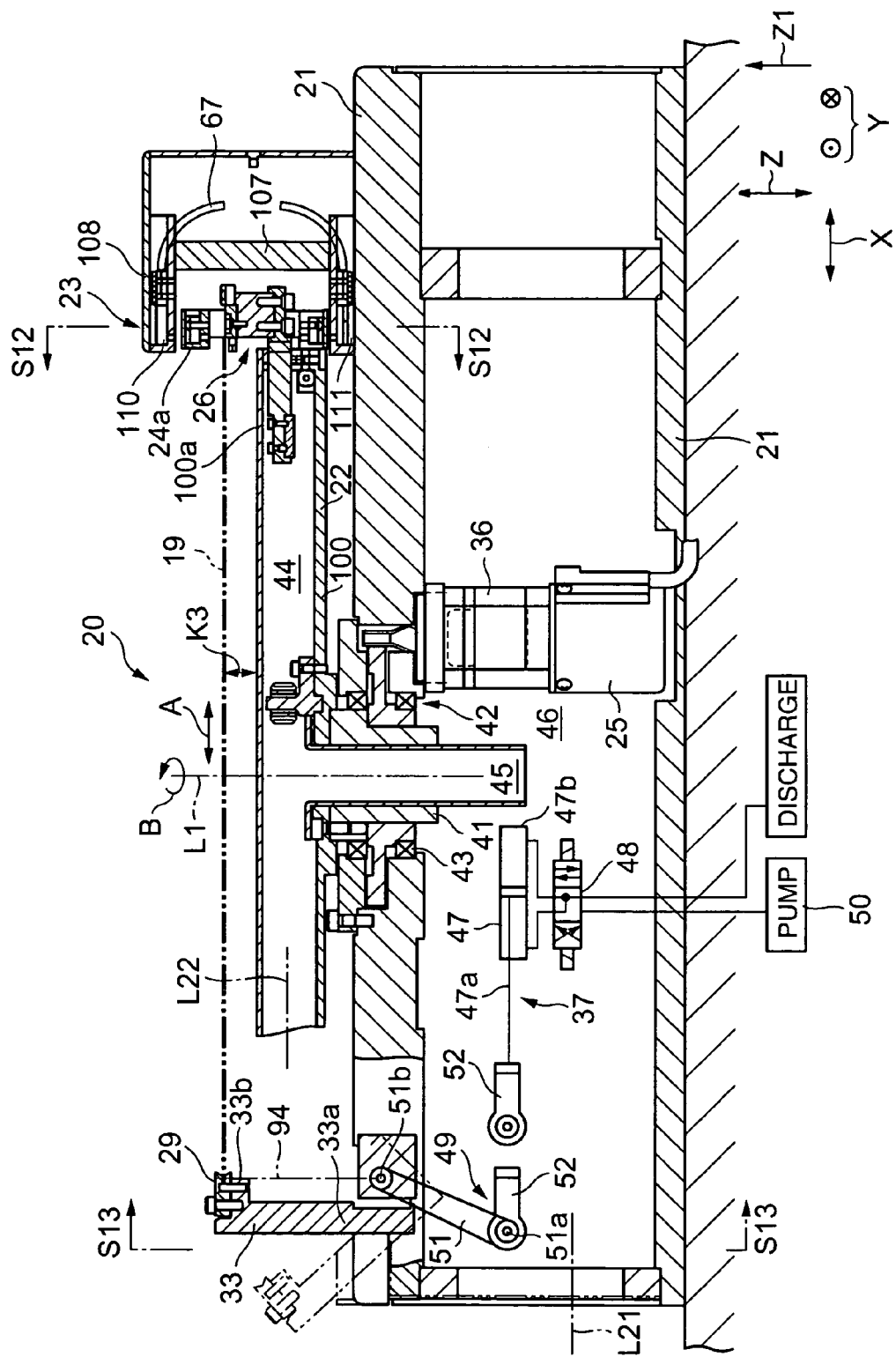
FIG. 11 is a sectional view of the aligner 20 in a state where a rotational arm and a base 21 are superposed.

FIG. 11 is a sectional view of the aligner 20 in a state where the rotational arm and the base 21 are superposed such that the arm axis L2 and the base axis L21 are parallel. The rotational arm 22 can be turned to a position where the arm axis L22 is parallel to the base axis L21.

The base 21 holds therein the servomotor 36, namely, the rotational arm driving device, and the encoder 25. The rotational arm 22 has a connecting member 41 extending from the arm body 100 along the pivotal axis L1 into the base 21. The connecting member 41 is a hollow, cylindrical member extending coaxially with the pivotal axis L1. The connecting member 41 is supported in a bearing 43 on the base 21 for turning about the pivotal axis L1. Power of the servomotor 36 is transmitted to the connecting member 41 by a power transmission mechanism 42. For example, the power transmission mechanism 42 includes gear trains and belts. Preferably, the power transmission mechanism 42 includes a reduction gear that reduces the input speed of the power of the servomotor 36 into a lower output speed.

An interior space 44 in the arm body 100 communicates with the interior space 46 in the base 21 by means of the interior space 45 in the connecting member 46. Cables for transmitting signals and power to the rotational arm 22 are extended from the interior space 46 in the base 21 through the interior space 45 in the connecting member 46 into the interior space 44 in the rotational arm 22. The cables thus arranged in the rotational arm 22 do not obstruct the turning of the rotational arm 22 for position adjusting operations.

The rotational arm 22 is not permitted to turn several turns in order that the cables may not be twisted. The rotational arm 22 is turned about the pivotal axis L1 in opposite circumferential directions B namely, a first circumferential direction B and a second circumferential direction B. When the rotational arm 22 is turned in either of the opposite circumferential directions B, for example in the first circumferential direction B, for one cycle of the position adjusting procedure to adjust the position of the wafer 19, the rotational arm 22 is turned in the other circumferential direction B, for example, the second circumferential direction B, for the next cycle of the position adjusting procedure.

The cables extending through the connecting member 41 include, for example, a cable for transmitting output signals provided by the second notch detectors 24a and 24b, and a cable for transmitting power for driving the holder driving devices.

Each of the shifting arm driving devices 37 includes a pneumatic cylinder 47, a solenoid valve 48 and a linkage 49. The shifting arm driving devices 37 are installed in the base 21. A pump 50 supplies compressed air to the pneumatic cylinder 47 to drive a piston rod 47a for axial movement. A free end part 52 of the piston rod 47a is pivotally joined to one end part 51a of a shifting link 51.

The other end part 51b of the shifting link 51 is fixed indirectly to end parts 32a and 33a (34a and 35a) of the shifting arms 32 and 33 (34 and 35). The end part 52 of the piston rod 47a and the link 51 form the linkage 49. The piston rod 47a is moved axially to turn the shifting arms 32 and 33 (34 and 35) about the axis L2 (L3).

The pneumatic cylinder 47 is a double-acting pneumatic cylinder. The piston rod 47a of the pneumatic cylinder 47 partially protrudes from a cylinder 47b. The piston rod 47a moves forward or backward according to the displacement of the piston. Compressed air is supplied into a first pressure chamber on one side of the piston of the pneumatic cylinder 47 and air is discharged from a second pressure chamber on the other side of the piston to advance the piston rod 47a. Compressed air is supplied into the second pressure chamber and air is discharged from the first pressure chamber to retract the piston rod 47a.

The solenoid valve 48 is, for example, a four-port three-position selector valve. The solenoid valve 48 is operated by command signals provided by the controller 38 to change the connection of air lines. When the controller 38 gives the solenoid valve an exhaust command signal, the solenoid valve 48 is set for a displacement permitting mode that permits the displacement of the piston rod 47a. In the displacement permitting mode, the pneumatic cylinder 47 is disconnected from the pump 50, the first and the second pressure chamber of the pneumatic cylinder 47 are connected, and the first and the second pressure chamber are connected to a discharge line for discharging compressed air. Consequently, the piston rod 47a can be moved in opposite directions by external force.

When the controller 38 gives the solenoid valve 48 an advancement command signal, the solenoid valve 48 is set for an advancing mode. In the advancing mode, the pump 50 supplies compressed air into the first pressure chamber of the pneumatic cylinder 47 and compressed air is discharged from the second pressure chamber of the pneumatic cylinder 47 to advance the piston rod.

When the controller gives the solenoid valve 48 a retraction command signal, the solenoid valve 48 is set for a retracting mode. In the retracting mode, the pump 50 supplies compressed air into the second pressure chamber of the pneumatic cylinder 47 and compressed air is discharged from the first pressure chamber of the pneumatic cylinder 47 to retract the piston rod. The controller 38 thus controls the condition of the solenoid valve 48 to control the movement of the piston rod.

The aligner 20 may be provided with a plurality of pneumatic cylinders 47 and a plurality linkages 51 respectively for the plurality of shifting arms 32 to 35. The shifting arms 32 to 35 are interlocked mechanically or electrically for coordinate operations.

The holders 26 and 27 are disposed with their support surfaces at a height of K3 from the arm body 100. The wafer 19 held by the holders 26 and 27 is spaced from the arm body 100 by a gap equal to the height K3. The height K3 is greater than the thickness of the robot hand 18 and hence the robot hand 18 can be inserted in the space between the wafer 19 and the arm body 100.

The shifters 28 to 31 at the holding position hold the wafer 19 such that the wafer 19 is spaced by a gap equal to the height K3 from the arm body 100. The height of the wafer 19 does not change when the wafer 19 is transferred from the rotational arm 22 to the shifting arms 32 to 35. Consequently, any vertical force does not act on the wafer 19 in a direction along the thickness of the wafer 19 and hence the wafer 19 will not be damaged when the same is transferred from the rotational arm 22 to the shifting arms 32 to 35 and vice versa.

Figure 12:
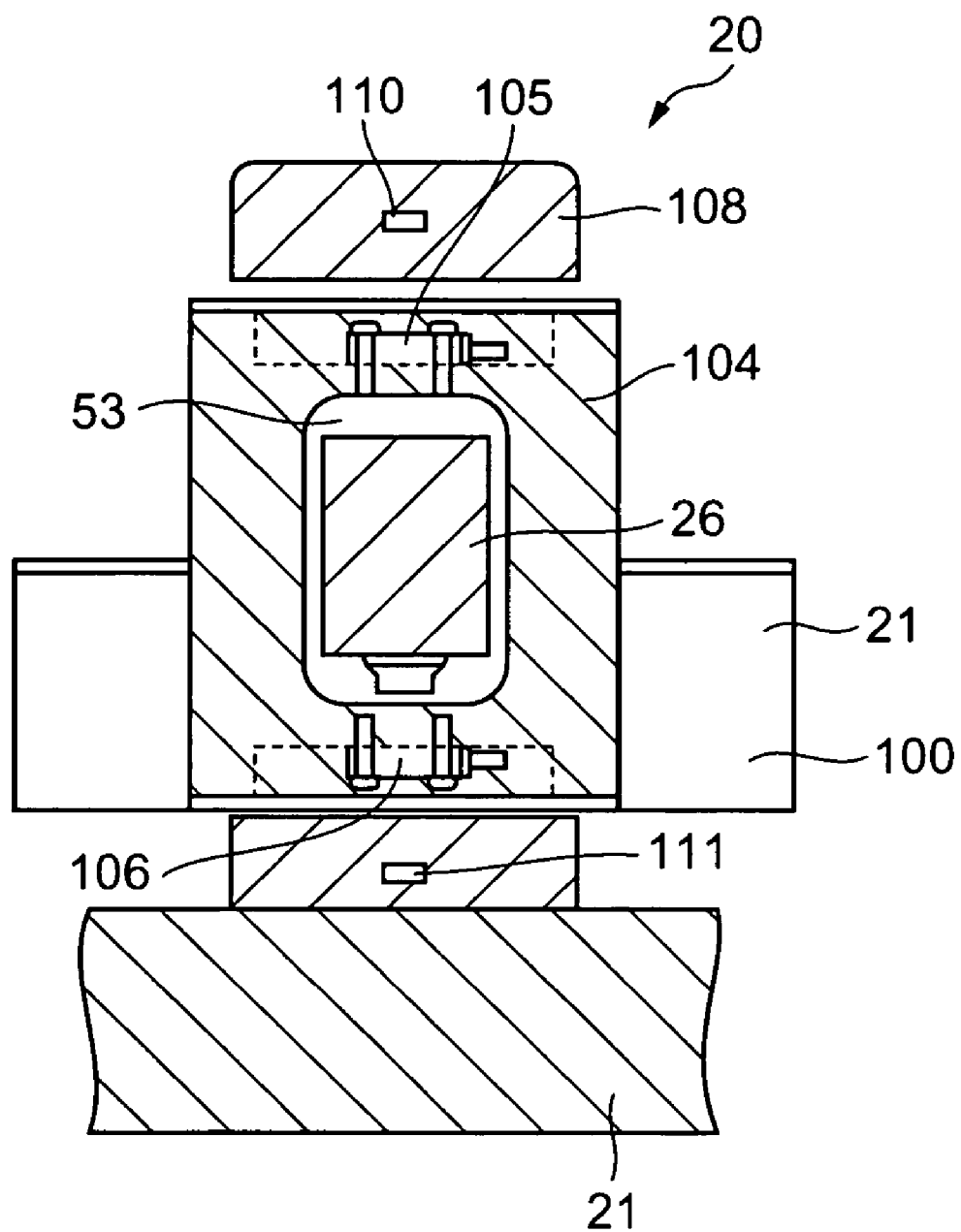
FIG. 12 is a sectional view taken on the line S12—S12 in FIG. 11 of the aligner 20.

FIG. 12 is a sectional view taken on the line S12—S12 in FIG. 11 of the aligner 20. The arm-side detectors 103 and 104 have openings 53, respectively. The openings 53 extend in the direction of movement of the holders 26 and 27. Outer space with respect to the radial direction A communicates with the interior space 44 in the arm body 100 by means of the openings 53. The holders 26 and 27 move outward with respect to the radial direction A through the openings 53 without being interfered with by the arm-side detectors 103 and 104. Thus the second notch detectors 24a and 24b are able to be opposed to the edge 16.

Figure 13:
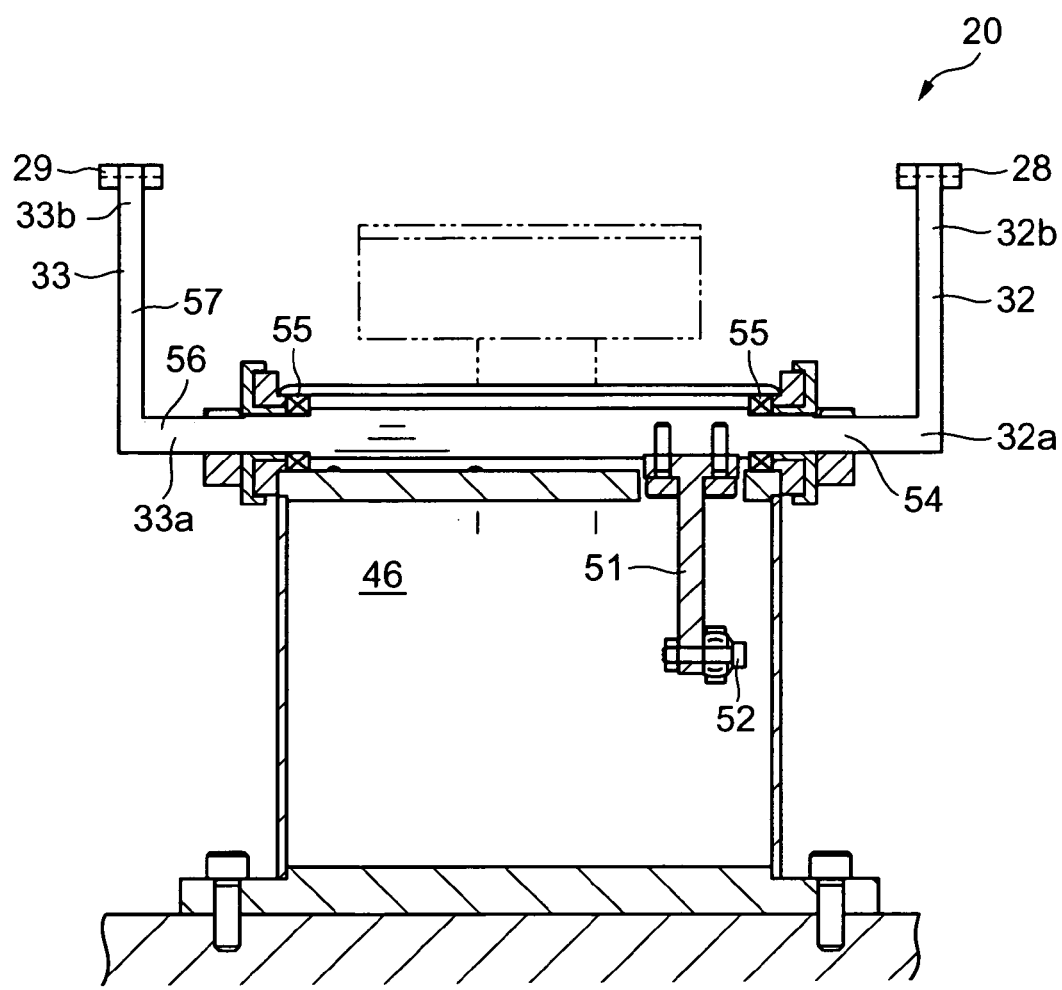
FIG. 13 is a sectional view taken on the line S13—S13 in FIG. 11 of the aligner 20.

FIG. 13 is a sectional view taken on the line S13—S13 in FIG. 11 of the aligner 20. The shifting links 51 are fastened to a turning shaft 54 capable of turning respectively about the axes L2 and L3, respectively. The turning shafts 54 are supported for turning in bearings 55 on the base 21. Base end parts of the shifting arms 32 to 35 are fastened to the turning shafts 54, respectively. Each of the shifting arms 32 to 35 has an L-shape and includes a first member 56 protruding from the base 21 along the Y-axis, and a second member 57 extending upward from the outer end of the first member 56. Thus the respective shifters 28 and 29 of the first shifting arm 32 and the second shifting arm 33 are spaced circumferentially apart from each other and are able to hold the wafer 19 stably.

The first shifting arm 32 and the second shifting arm 33 have axes aligned with the axis L2 and are fastened to the turning shaft 54. Thus the two shifting arms 32 and 33 operate coordinately. Similarly, the third shifting arm 34 and the fourth shifting arm 35 have axes aligned with the axis L3 and are fastened to a single shaft. Thus the two shifting arms 34 and 35 can be coordinately operated by a single pneumatic cylinder.

Figure 14:
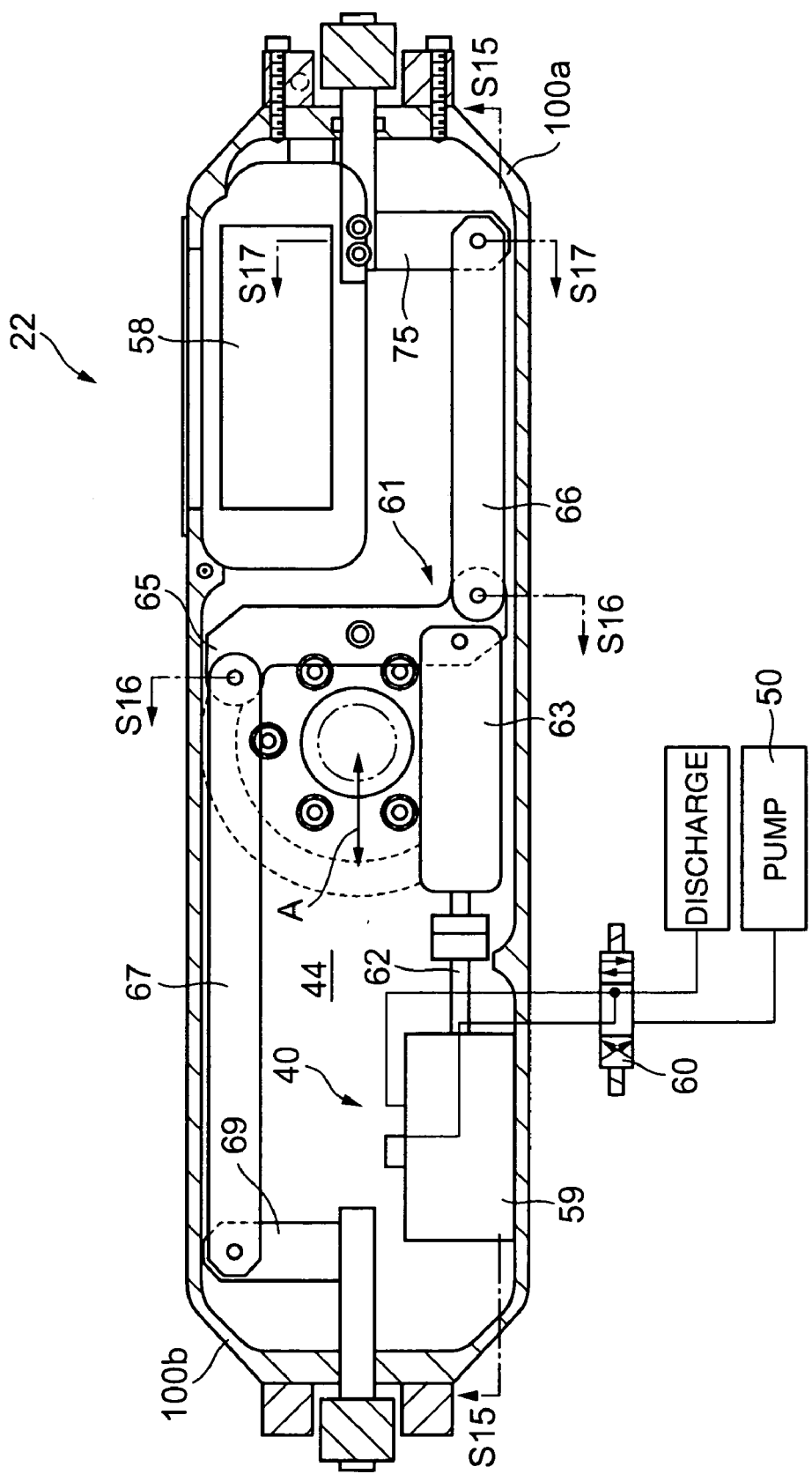
FIG. 14 is a sectional view of the rotational arm 22.
Figure 15:
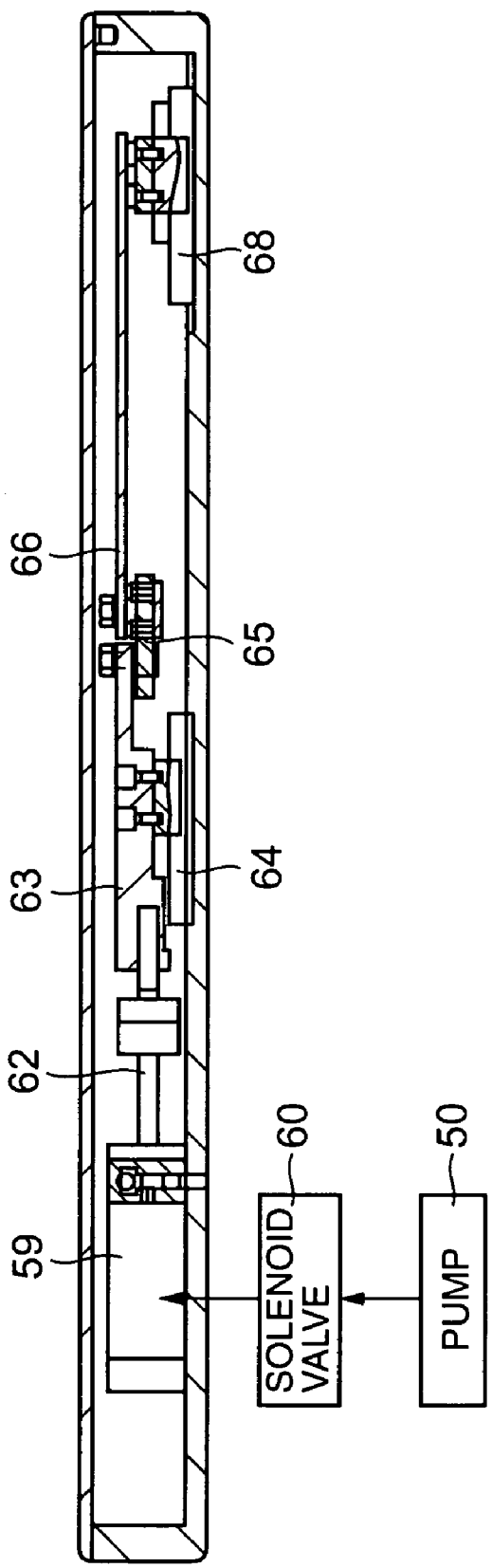
FIG. 15 is a sectional view taken on the line S15—S15 in FIG. 14 of the rotational arm 22.
Figure 16:
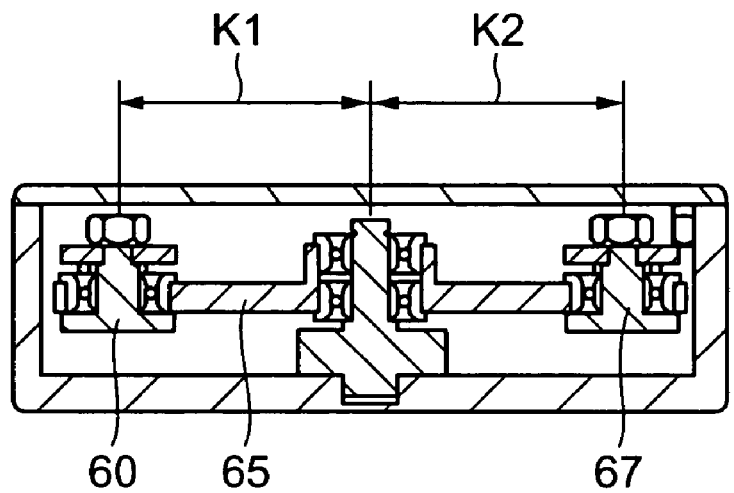
FIG. 16 is a sectional view taken on the line S16—S16 in FIG. 14 of the rotational arm 22.
Figure 17:
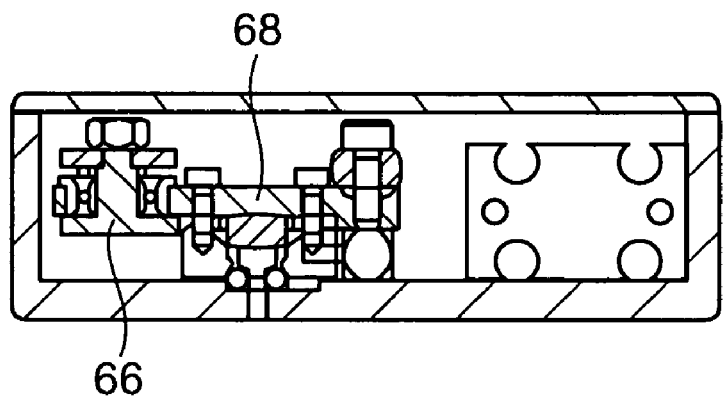
FIG. 17 is a sectional view taken on the line S17—S17 in FIG. 14 of the rotational arm 22.

FIG. 14 is a sectional view of the rotational arm 22, FIG. 15 is a sectional view taken on the line S15—S15 in FIG. 14 of the rotational arm 22, FIG. 16 is a sectional view taken on the line S16—S16 in FIG. 14 of the rotational arm 22 and FIG. 17 is a sectional view taken on the line S17—S17 in FIG. 14 of the rotational arm 22.

The holder driving device 40 includes a pneumatic cylinder 59, a solenoid valve 60 and a linkage 61. The pneumatic cylinder 59 and the linkage 61 are disposed in the interior space 44 in the arm body 100. The pneumatic cylinder 59 and the solenoid valve 60 are similar to the pneumatic cylinder 47 and the solenoid valve 48 of each shifting arm driving device 37 and hence the description thereof will be omitted.

The piston rod of the pneumatic cylinder 59 of the holder driving device 40 is connected to a first link 63. The first link 63 is guided for movement parallel to the arm axis L22 and is restrained from movement in other directions by a first guide rail 64 parallel to the arm axis L22. An end part of the first link 63 remote from the pneumatic cylinder 59 is pivotally joined to a second link 65. The first link 63 and the second link 65 are able to turn relative to each other.

The second link 65 extends along the width of the arm body 100 and is able to turn for angular displacement about a center of angular displacement near the pivotal axis L1. The second link 65 extends from the center of angular displacement in opposite directions along the width of the arm body 100. A third link 66 and a fourth link 67 are pivotally joined to the opposite ends of the second link 65.

The joint of the third link 66 and the second link 65 and the joint of the fourth link 67 and the second link 65 are at equal distances from the center of angular displacement of the second link 65. The third link 66 extends from the joint of the third link 66 and the second link 65 toward the end part 100a of the arm body. The fourth link 67 extends from the joint of the fourth link 67 and the second link 65 toward the other end part 100b of the arm body.

The third link 66 is guided by a second guide rail 68 parallel to the arm axis L22. The third link 66 is movable in directions perpendicular to the axial direction A and is restrained from movement in other directions. The third link 66 is connected to the first holder 26 by a connecting member 75. The first holder 26 moves in the radial directions A.

Similarly, the fourth link 67 is guided by a guide rail and is connected to the second holder 27 by a connecting member 69. The second holder 26 moves in the radial directions A.

The piston rod of the pneumatic cylinder 59 is advanced and retracted to move the first link 63 in the radial directions A. Then, the second link 65 is turned for angular displacement about the center of angular displacement. As shown in FIG. 16, a distance K1 between the center of angular displacement and the joint of the second link 65 and the third link 66 is equal to a distance K2 between the center of angular displacement and the joint of the second link 65 and the fourth link 67. Thus the third link 66 and the fourth link 67 are moved for the same distance in opposite radial directions A, respectively. Consequently, the first holder 26 and the second holder 27 respectively connected to the third link 66 and the fourth link 67 are moved in the opposite radial directions A so as to approach and to part from each other.

The holders 26 and 27 can be driven for movement for the same distance in the opposite radial directions A, respectively, through the second link 65 by the single pneumatic cylinder 59. Although the two holders 26 and 27 are driven for displacement by the plurality of linkages in this embodiment, the two holders 26 and 27 may be driven for displacement a belt-pulley driving mechanism.

The holders are moved in the radial directions A toward each other with the wafer 19 held coaxially with the pivotal axis L1 by the robot hand 18 to hold the wafer 19 on the rotational arm 22. The robot hand 18 is retracted after the wafer 19 has been thus held on the aligner 20.

After the wafer 19 has been held on the rotational arm 22, the shifters 28 to 31 are brought into contact with the edge 16 of the wafer 19 and then the wafer 22 is released from the rotational arm 22 to transfer the wafer 19 from the rotational arm 22 to the shifting arms 32 to 35. The rotational arm 22 is able to turn about the pivotal axis L1 for angular displacement after the wafer 19 has been transferred from the rotational arm 22 to the shifting arms 32 to 35.

Similarly, the holders 26 and 27 are brought into contact with the edge 16 of the wafer 19 held by the holding arms 32 to 35, and then, the wafer 19 is released from the shifting arms 32 to 35 to transfer the wafer 19 from the shifting arms 32 to 35 to the rotational arm 22.

Figure 18:
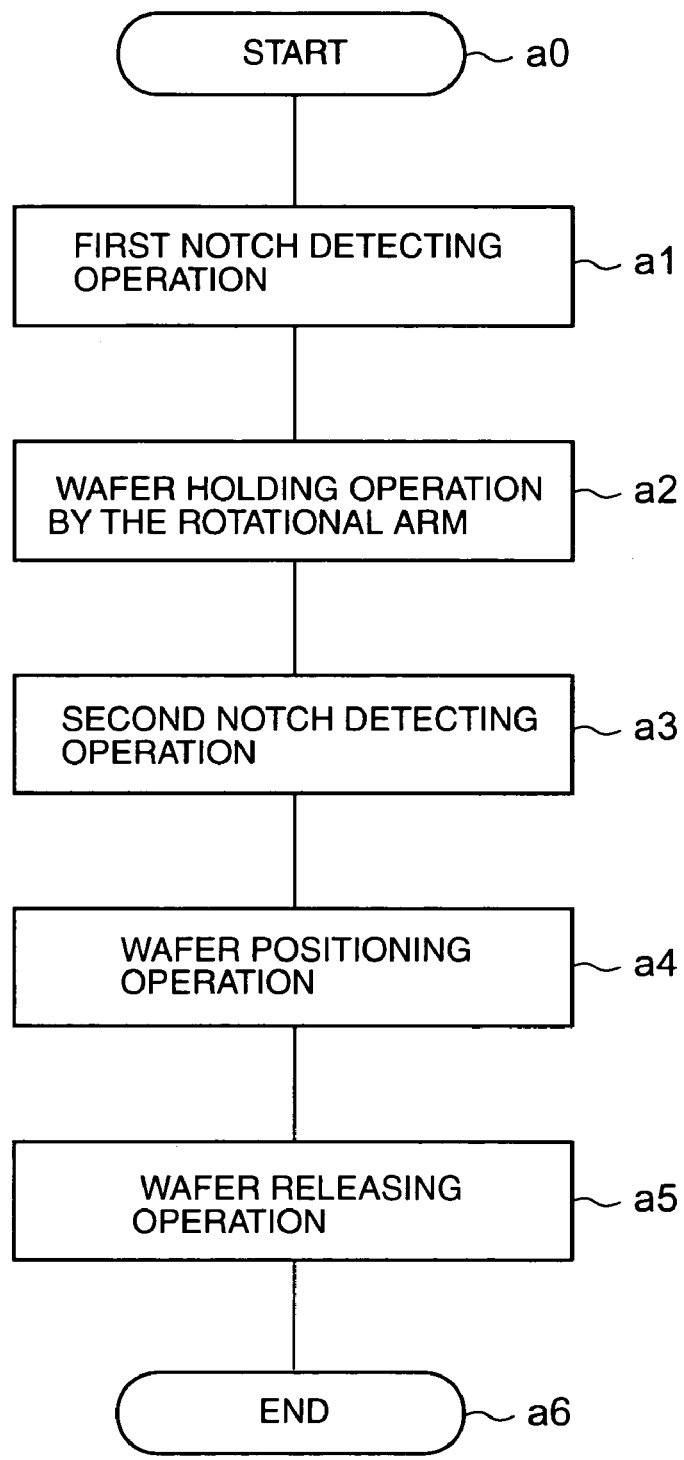
FIG. 18 is a flow chart of a general control procedure to be carried out by a controller 38.
Figure 19:
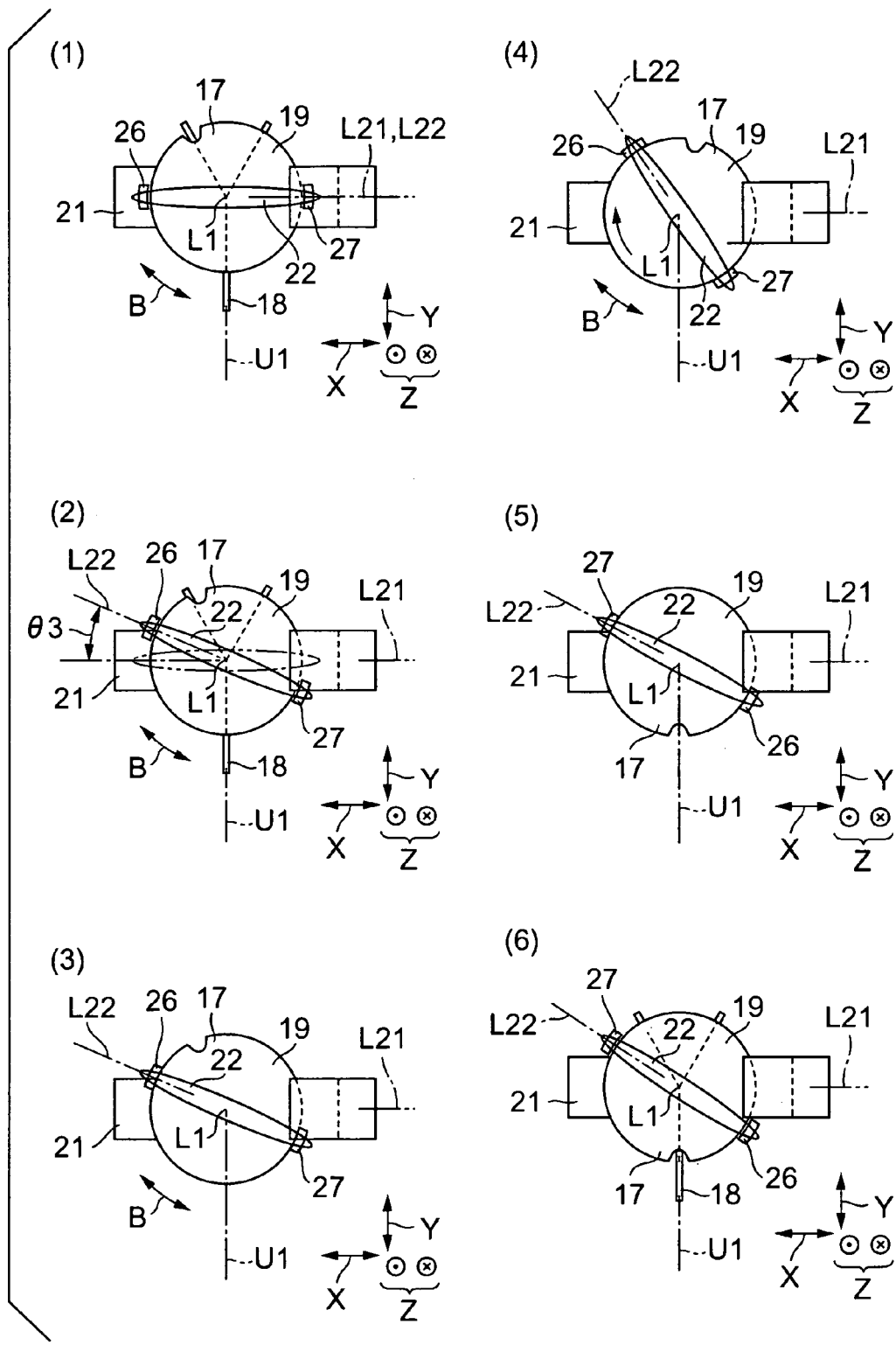
FIG. 19 is a plan view of assistance in explaining a position adjusting procedure to be carried out by the aligner 20.

FIG. 18 is a flow chart of a general control operation to be carried out by the controller 38 and FIG. 19 is a plan view of assistance in explaining a position adjusting procedure to be carried out by the aligner 20. The controller 38 moves the rotational arm 22 to its home position in step a0. For example, when the rotational arm 22 is set at the home position, the arm axis L22 is perpendicular to a robot path U1 along which the robot hand 18 moves toward the rotational arm 22. Thus the robot hand 18 will not touch the rotational arm 22 even if the robot hand 18 shakes and the robot hand 18 can be moved toward and away from the aligner 20 at high speeds.

After the wafer 19 is positioned coaxially with the pivotal axis L1 by the robot hand 18 as shown in FIG. 19(1), the controller 38 starts the control operation in step a1.

In step a1, the rotational arm 22 is turned through a predetermined angle θ3 as shown in FIG. 19(2) before the rotational arm 22 holds the wafer 19. The angle θ3 is the least necessary angle. For example, the angle θ3 is 10°.

When the rotational arm 22 is turned from the home position through the angle θ3, the second notch detectors 24a and 24b are turned along the edge 16 of the wafer 19 through the angle θ3 in the circumferential direction B. The controller 38 decides whether or not the notch 17 is detected on the basis of signals provided by the second notch detectors 24a and 24b during the angular displacement of the rotational arm 22.

If the notch 17 is detected during the angular displacement of the rotational arm 22, the controller 38 determines the angular position of the notch 17 on the basis of data provided by the second notch detectors 24a and 24b and the encoder 25. If the notch 17 is formed in an edge region swept by the second notch sensor 24a or 24b, the controller 38 turns the rotational arm 22 to an angular position such that the holders 26 and 27 are spaced in the circumferential direction B from the notch 17. If the notch 17 is not detected during the angular displacement of the rotational arm 22, the controller 38 turns the rotational arm 22 such that holders 26 and 27 are in edge regions swept by the second notch sensor 24a or 24b during the angular displacement of the rotational arm 22.

Suppose that the arm axis L22 is turned from its home position through an angle of, for example, 10° for angular displacement in the circumferential direction B. If the notch 17 is detected before the arm axis L22 is turned through an angle of 5° from its home position in the circumferential direction B, the rotational arm 22 is turned such that the arm axis L22 is positioned at 10° from the home position in the circumferential direction B. If the notch 17 is detected after the arm axis L22 has been turned from its home position beyond 5° in the circumferential direction B, the arm axis L22 is positioned at the home position. Thus the rotational arm 22 is turned for angular displacement so that the holders 26 and 27 are not positioned opposite to the notch 17 when the notch 17 is detected while the rotational arm 22 is turned through 10°, and then the wafer 19 is held on the rotational arm 22.

If the notch 17 is not detected during the angular displacement of the rotational arm 22, the arm axis L22 is positioned at an angular distance of 5° from its home position in the circumferential direction B, and then step a2 is executed.

As shown in FIGS. 2 and 4, a circumferential distance K5 for which the holders 26 and 27 are moved while the rotational arm 22 is turned through the angle θ3 for angular displacement is longer than a circumferential length K4 of the opposite segments 96 and 97 of the edge of the wafer 19 in contact with the holders 26 and 27. Therefore, the holders 26 and 27 are surely separated in the circumferential direction B from the notch 17 in steps following step a2. Time necessary for completing a first notch detecting operation in step a1 can be curtailed by using the least necessary angle as the angle θ3.

In step a2, the holder driving device 40 is controlled to hold the wafer 19 by the holders 26 and 27. After the wafer 19 has been completely held by the holders 26 and 27, a signal indicating the completion of holding the wafer 19 by the holders 26 and 27 is given to the robot hand driving device 39 to retract the robot hand 18 from the aligner 20.

After the controller 38 has confirmed that the wafer 19 is held by the holders 26 and 27 and the robot hand 18 is retracted from the aligner 20 as shown in FIG. 19(3), step a3 is executed.

In step a3, the rotational arm 22 is turned fully once as shown in FIG. 19(4). The first notch detector 23 detects the notch 17 and sends a notch detection signal to the controller 38 during the angular displacement of the rotational arm 22. Since the notch 17 coincides with neither of the holders 26 and 27, the notch 17 can be detected without fail while the rotational arm 22 is turned fully once. The position of the notch 17 is determined on the basis of data provided by the encoder 25 and the first notch detector 23, and then step a4 is executed.

In step a4, the rotational arm driving device 36, the holder driving device 40 and the shifting arm driving devices 37 are controlled to drive the rotational arm 22, the holders 26 and 27 and the shifting arms 32 to 35 so that the notch 17 is positioned at a predetermined angular position. After the position of the wafer 19 has been adjusted to position the notch 17 at the reference angular position as shown in FIG. 19(5), the robot hand driving device 39 is informed of the completion of the positional adjustment of the wafer 19, and then step a5 is executed. Consequently, the robot hand 18 moves toward the aligner 20.

After the confirmation of the arrival of the robot hand 18 at a position where the wafer 19 can be transferred to the robot hand 18, the holder driving device 40 is controlled so as to release the wafer 19 from the holders 26 and 27, the wafer 19 is transferred from the rotational arm 22 to the robot hand 18 as shown in FIG. 19(6) in step a5, and then step a6 is executed. In step a6, the control operation of the controller 38 is ended.

Since the notch 17 is not formed in neither of edges in contact with the holders 26 and 27, the first notch detector 23 is able to detect the notch 17 without fail without being obstructed by the holders 26 and 27. In other words, the angular position of the notch 17 can be surely measured simply by turning the rotational arm 22 for one fully turn at the maximum after holding the wafer 19 on the rotational arm 22.

Thus, the angular position of the wafer 19 held by the holders 26 and 27 relative to the rotational arm 22 does not need to be changed several times and the wafer 19 does not need to be turned more than one full turn. Consequently, time necessary for detecting the notch 17 can be curtailed and time necessary for the positional adjustment of the wafer 19 can be curtailed.

The wafer 19 is held by the holders 26 and 27 on the rotational arm 22. Therefore, the wafer 19 unable to shift relative to the rotational arm 22, and the wafer 19 held by the holders 26 and 27, as compared with a wafer supported on support members, can be turned at a high rotating speed. Consequently, the positional adjustment of the wafer 19 can be completed in a shorter time.

Preferably, the angular velocity of the rotational arm 22 in the first notch detecting operation conducted in step a1 is higher than that in the second notch detecting operation conducted in step a3. The first notch detecting operation does not need to achieve the accurate determination of the position of the notch 17 and needs to determine only whether or not the notch 17 coincides with the holder 26 or 27. Time necessary to complete the position adjusting procedure can be curtailed without decreasing the accuracy of detecting the notch 17 by turning the rotational arm 22 at a high angular velocity.

Time for the positional adjustment of the wafer 19 can be further curtailed by turning the rotational arm 22 through the least necessary angle in the first notch detecting operation in step a1. If the angular position of the notch 17 can be determined by the first notch detecting operation in step a1, the second notch detecting operation in step a3 may be omitted. Thus the position adjusting procedure for adjusting the position of the wafer 19 can be completed in a shorter time.

If the notch 17 is detected before the rotational arm 22 is turned fully once in the second notch detecting operation in step a3, the position of the wafer 19 may be adjusted immediately in step a4.

Figure 20:
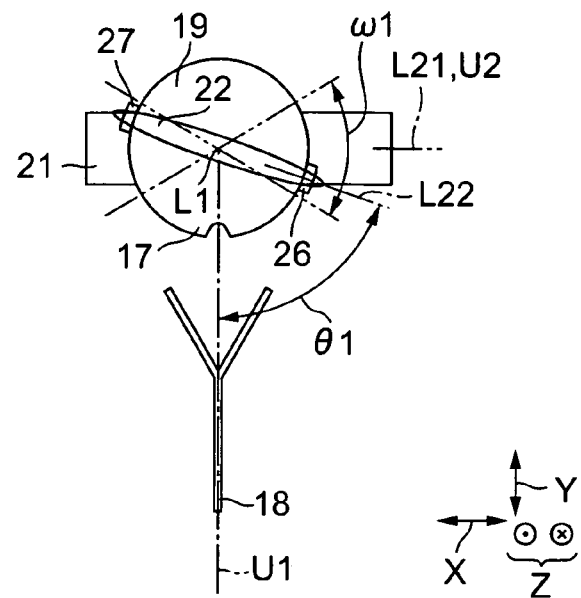
FIG. 20 is a plan view of assistance in explaining a first position adjusting procedure.

The controller 38 conducts one of three position adjusting procedures in step a4 according to the angular position of the notch 17 determined in step a3. FIG. 20 is a plan view of assistance in explaining a first position adjusting procedure. The controller 38 conducts the first position adjusting procedure when it is decided that the notch 17 is at the reference angular position and the rotational arm 22 is in a transfer-permissible range that permits the transfer of the wafer 19 from the rotational arm 22 to the robot hand 18.

The first position adjusting procedure turns the rotational arm 22 to position the notch 17 at the reference angular position, holding the shifting arms 32 to 35 inoperative. The first position adjusting procedure is conducted when the arm axis L22 extending at an angle θ1 to the robot path U1 along which the robot hand 18 advances toward the wafer 19 is in a robot hand noninterference angular range ω1 after the positional adjustment of the wafer 19 as shown in FIG. 20.

The robot path U1 extends in a direction in which the robot hand 18 toward the aligner 20 to receive the wafer 19 from the aligner 20 in a plane perpendicular to the pivotal axis L1. The robot hand noninterference angular range ω1 is an angular range in which the rotational arm 22 does not interfere with the robot hand 18 when the robot hand 18 advances toward the rotational arm 22 to receive the wafer 19 from the rotational arm 22. If the rotational arm 22 is on the robot path U1, the robot hand 18 will collide against the rotational arm 22.

When the arm axis L22 extending at the angle θ1 to the robot path U1 is in the robot hand noninterference angular range ω1 after the positional adjustment of the wafer 19, the robot hand 18 is able to receive the positioned wafer 19 without being interfered by the rotational arm 22 simply by turning the rotational arm 22.

For example, the robot hand noninterference angular range ω1 is an angular range that makes the angle θ1 between the robot path U1 and the arm axis L22 in the range of 50° to 130°; that is, the robot hand noninterference angular range ω1 is a range of ±40° from an imaginary line U2 perpendicular to the robot path U1. When the arm axis L22 is in such an angular range, the shifting arms 32 to 35 are not driven and the position of the wafer 19 is adjusted by turning the rotational arm 22 for angular displacement.

The controller 38 conducts a second position adjusting procedure or a third position adjusting procedure when it is decided that the wafer 19 cannot be transferred to the robot hand 18 only turning the rotational arm 22 for angular displacement. The second and the third position adjusting procedure use the shifting arms 32 to 35 to adjust the angular position of the notch 17 relative to the rotational arm 22.

Figure 21:
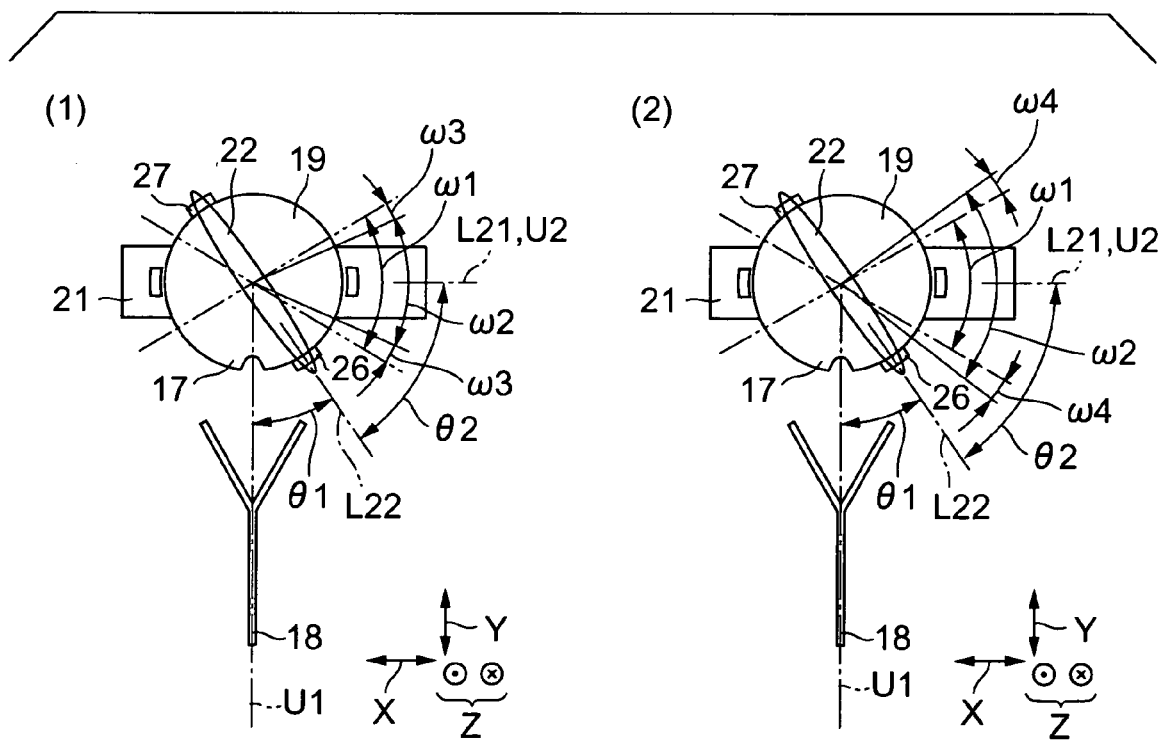
FIG. 21 is a plan view of assistance in explaining a second position adjusting procedure.

FIG. 21 is a plan view of assistance in explaining the second position adjusting procedure. The second position adjusting procedure is conducted when the arm axis L22 extending at an angle θ1 to the robot path U1 is not in the robot hand noninterference angular range ω1 and the arm axis L22 extending at an angle θ2 to the base axis L21 is not in a shifting arm interference angular range ω2 after the positional adjustment of the wafer 19 as shown in FIG. 21.

The shifting arm interference angular range ω2 is an angular range in which the rotational arm 22 interferes with the shifting arms 32 to 35 when the wafer 19 is transferred from the rotational arm 22 to the shifting arms 32 to 35. If the rotational arm 22 is above the shifting arms 32 to 35, the rotational arm 22 interferes with the shifting arms 32 to 35.

When the arm axis L22 is not in the robot hand noninterference angular range ω1 and not in the shifting arm interference range ω2, the arm axis L22 extending at an angle θ to the robot path U1 must be shifted into the robot hand noninterference angular range ω1 by adjusting the angular position of the wafer 19 relative to the rotational arm 22. For example, the shifting arm interference angular range ω2 is ±40° from the base axis L21.

Figure 22:
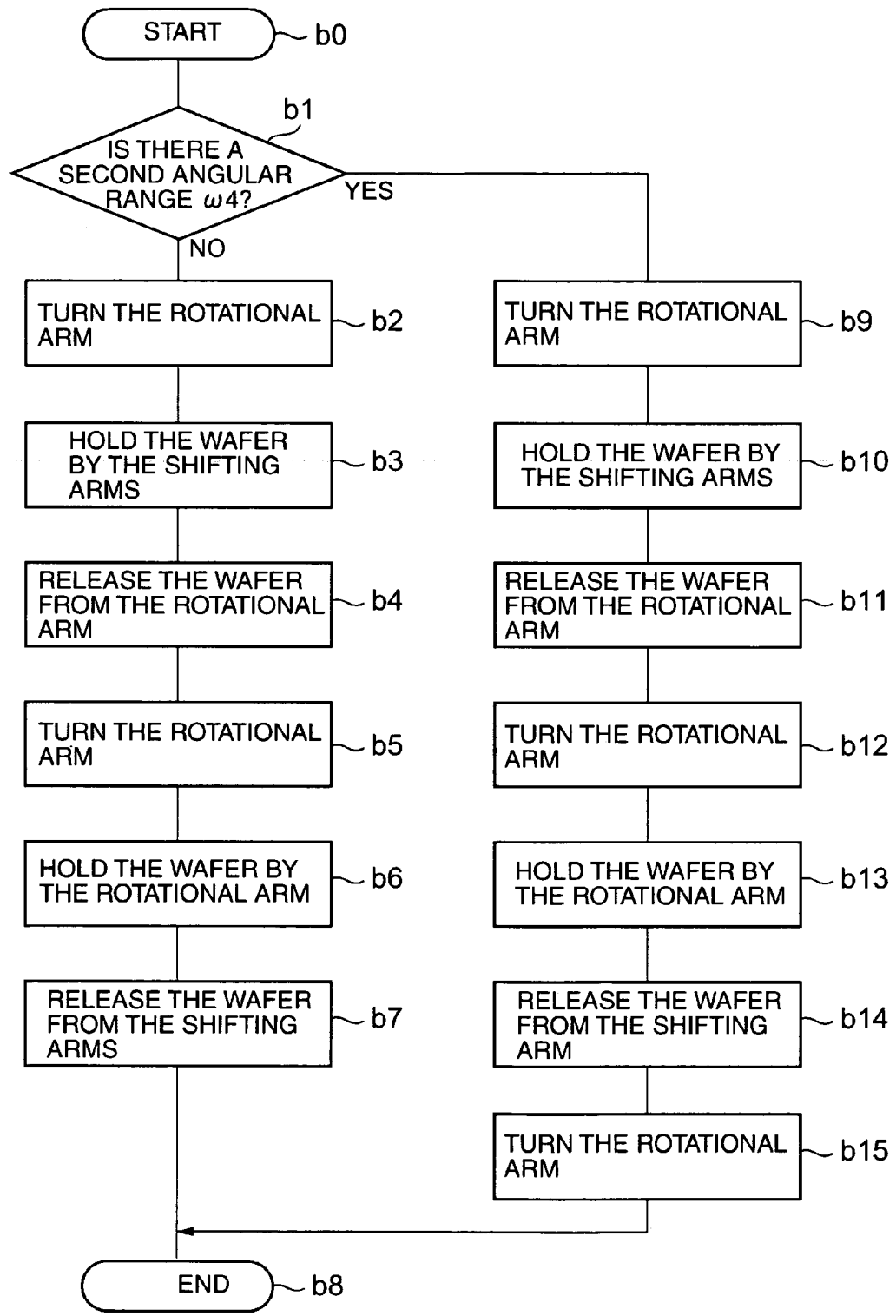
FIG. 22 is a flow chart of the second position adjusting procedure.
Figure 23:
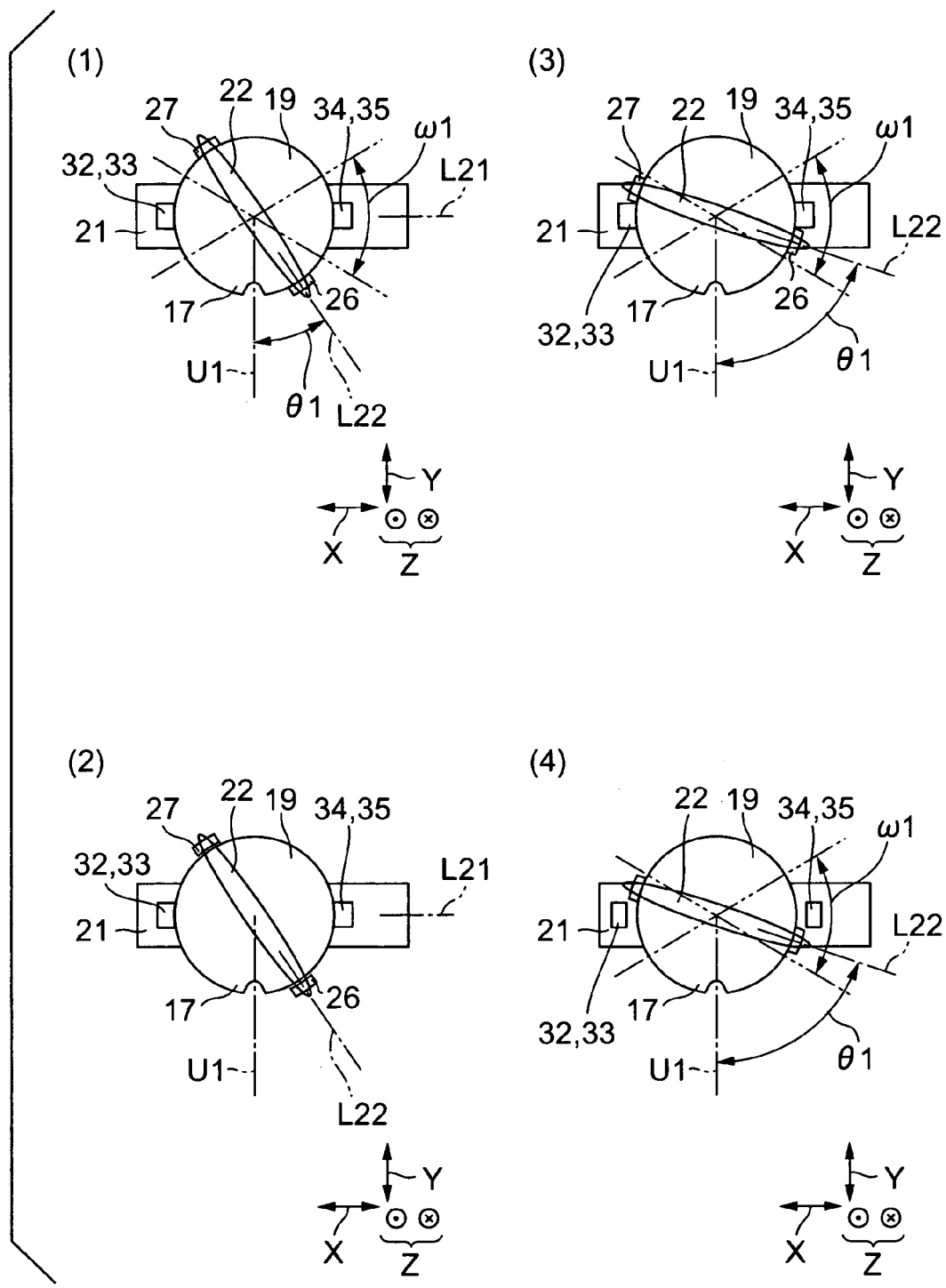
FIG. 23 is a plan view of assistance in explaining steps of the second position adjusting procedure.
Figure 24:
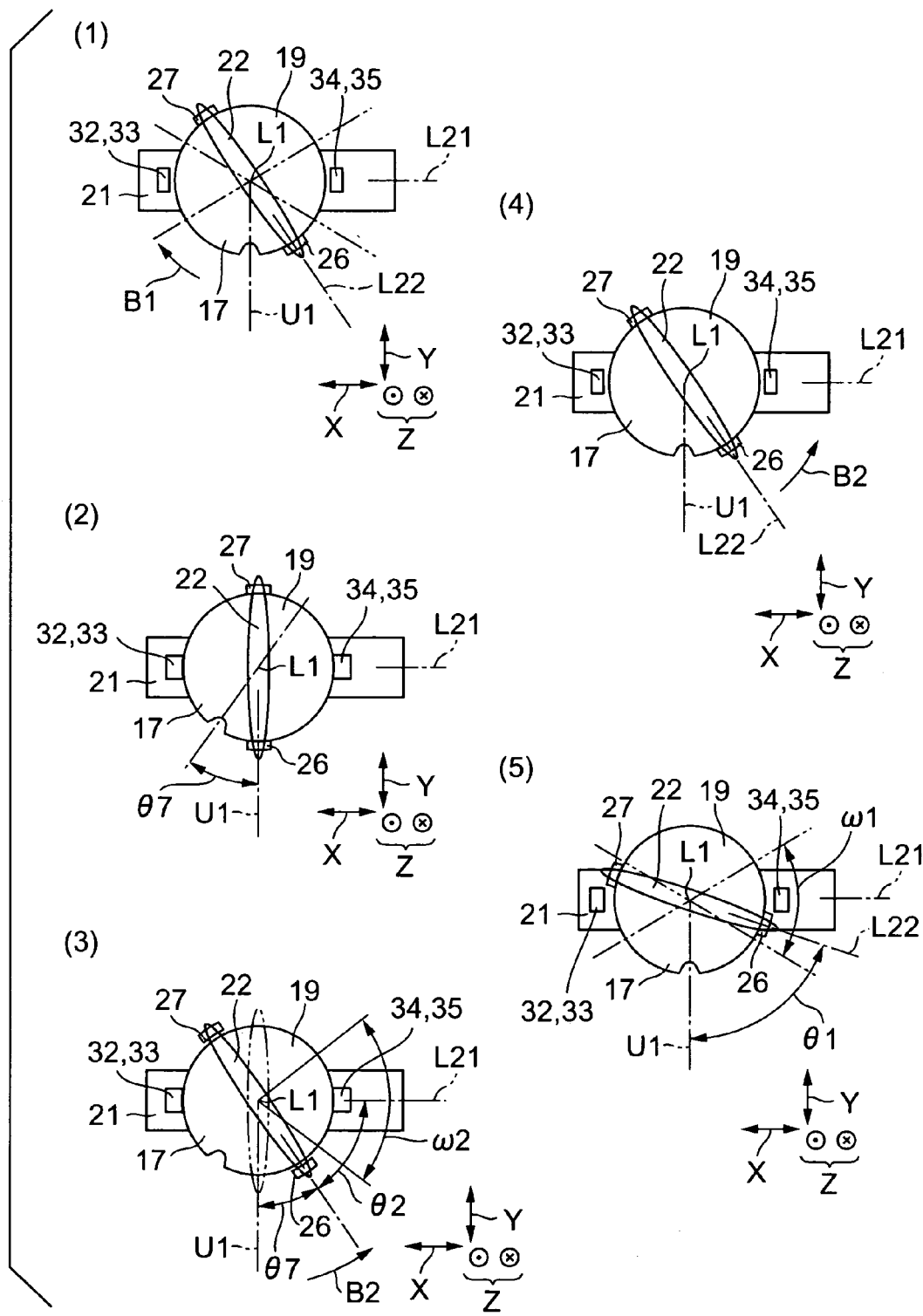
FIG. 24 is a plan view of assistance in explaining steps of the second position adjusting procedure.

FIG. 22 is a flow chart of the second position adjusting procedure and FIGS. 23 and 24 are plan views of assistance in explaining the second position adjusting procedure. When it is decided in step b0 that the second position adjusting procedure is necessary, the controller 38 starts the second position adjusting procedure in step b1.

Step b2 is executed when it is decided in step b1 that there is a first angular range ω3 included in the robot hand noninterference range ω1 and not included in the shifting arm interference angular range ω2 with the notch 17 held at the reference angular position. Step b9 is executed when it is decided in step b1 that there is a second angular range ω4 included in the shifting arm interference range ω2 and not included in the robot hand noninterference angular range ω1.

Step b2 is executed in a state shown in FIG. 21(1), and step b9 is executed in a state shown in FIG. 21(2). Step b1 is executed when the robot hand noninterference angular range ω1 coincides with the shifting arm interference angular range ω2.

The rotational arm 22 is turned to position the notch 17 at the reference angular position in step b2, and then the shifting arm driving devices 37 are controlled in step b3 such that the shifters 28 to 31 of the shifting arms 32 to 35 hold the wafer 19. Consequently, the wafer 19 is held by both the shifting arms 32 to 35 and the rotational arm 22 as shown in FIG. 23(1). Step b4 is executed after the shifting arms 32 to 35 have held the wafer 19.

In step b4, the holder driving device 40 is controlled so as to release the wafer 19 from the holders 26 and 27. Thus the rotational arm 22 becomes able to turn for angular displacement as shown in FIG. 23(2). Then, in step b5, the rotational arm 22 is turned such that the angle θ1 between the arm axis L22 and the robot path U1 is in the robot hand noninterference angular range ω1.

In step b6, holder driving device 40 is controlled so as to hold the wafer 19 by the holders 26 and 27. In this state, the wafer 19 is held by both the shifting arms 32 to 35 and the rotational arm 22 as shown in FIG. 23(3). Step b7 is executed after the wafer 19 has been completely held by the rotational arm 22.

In step b7, the shifting arm driving devices 37 are controlled so as to release the wafer 19 from the shifters 28 to 31 by turning the shifting arms 32 to 35. Thus, the position of the wafer 19 is adjusted and the angle between the arm axis L22 and the robot path U1 can be included in the robot hand noninterference angular range ω1 as shown in FIG. 23(4). Then, the second position adjusting procedure is ended in step b8.

In step b9, the rotational arm 22 is turned in the circumferential direction B1 so that the notch 17 is deviated from the reference angular position by a predetermined first angle θ7. In other words, the rotational arm 22 at a position shown in FIG. 24(1) is turned through the predetermined first angle θ7 in the circumferential direction B1 so that the angle θ2 between the arm axis L22 and the base axis L21 may not be in the shifting arm interference angular range ω2.

In step b10, the shifting arm driving devices 37 are controlled such that the shifters 28 to 31 of the shifting arms 32 to 35 hold the wafer 19. Consequently, the wafer 19 is held by both the shifting arms 32 to 35 and the rotational arm 22 as shown in FIG. 24(2). Step b11 is executed after the shifting arms 32 to 35 have held the wafer 19.

In step b11, the holder driving device 40 is controlled so as to release the wafer 19 from the holders 26 and 27. Thus the rotational arm 22 becomes able to turn for angular displacement. Then, in step b12, the rotational arm 22 is turned such that the angle θ1 between the arm axis L22 and the robot path U1 is outside the shifting arm interference angular range ω2 as shown in FIG. 24(3).

Then, in step b13, the holder driving device 40 is controlled so as to hold the wafer 19 by the holders 26 and 27. Then, in step b14, the shifting arm driving devices 37 are controlled to turn the shifting arms 32 to 35 so that the wafer 19 is released from the shifters 28 to 31 as shown in FIG. 24(4).

Then in step b15, the rotational arm 22 is turned for angular displacement to position the notch 17 at the reference angular position. In this state, the angle θ1 between the arm axis L22 and the robot path U1 is included in the robot hand noninterference angular range ω1. Then, the second position adjusting procedure is ended in step b8.

When the notch 17 cannot be positioned at the reference angular position by a single cycle of the position adjusting procedure, the rotational arm 22 can be positioned so that the angle θ1 between the arm axis 22 and the robot path U1 is included in the robot hand noninterference angular range ω1 by displacing the notch 17 gradually relative to the rotational arm 22 and repeating steps b8 to b13 several times.

When the wafer 19 can be transferred from the shifting arms 32 to 35 to the robot hand 18, for example, in a state where the base axis L21 is perpendicular to the robot path U1, step b6 may be omitted and the wafer may be transferred from the shifting arms 32 to 35 to the robot hand 18 to reduce time necessary for the position adjustment.

Figure 25:
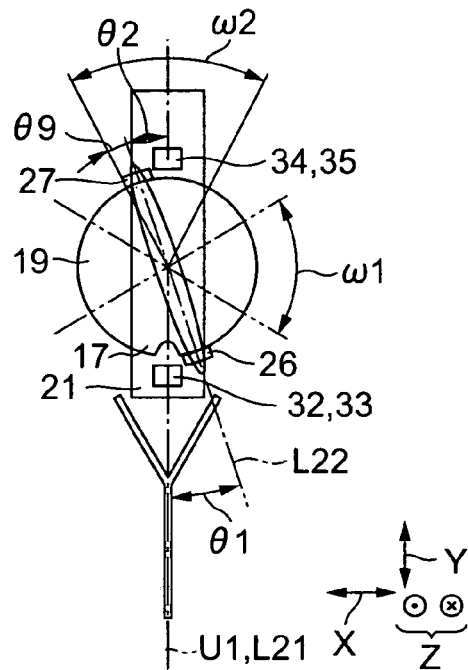
FIG. 25 is a plan view of assistance in explaining a third position adjusting procedure.

FIG. 25 is a plan view of assistance in explaining a third position adjusting procedure. The third position adjusting procedure is conducted when the angle θ1 between the arm axis L22 and the robot path U1 is not included in the robot hand noninterference angular range ω1, and the angle θ2 between the arm axis L22 and the base axis L21 is included in the shifting arm interference angular range ω2 in a state where the notch 17 is positioned at the reference angular position when the robot hand 18 advances in a certain advancing direction and the wafer 19 is at a certain position. The third position adjusting procedure is conducted when the rotational arm 22 interferes with the robot hand 18 and the wafer 19 cannot be transferred from the rotational arm 22 to the shifting arms 32 to 35 in a state where the notch 17 is positioned at the reference angular position.

Figure 26:
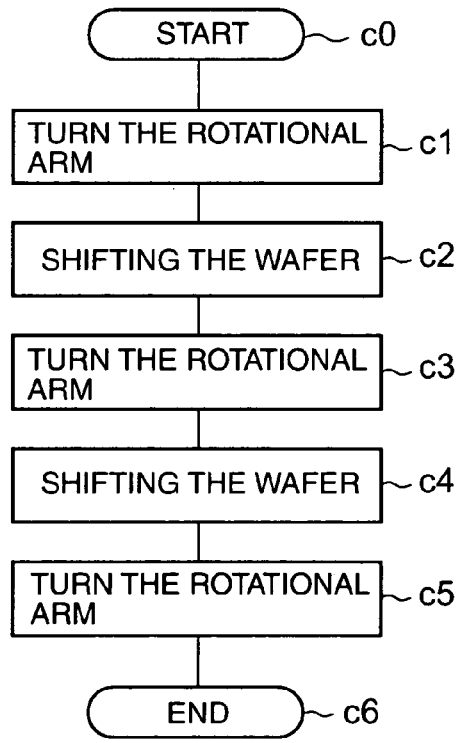
FIG. 26 is a flow chart of the third position adjusting procedure.
Figure 27:
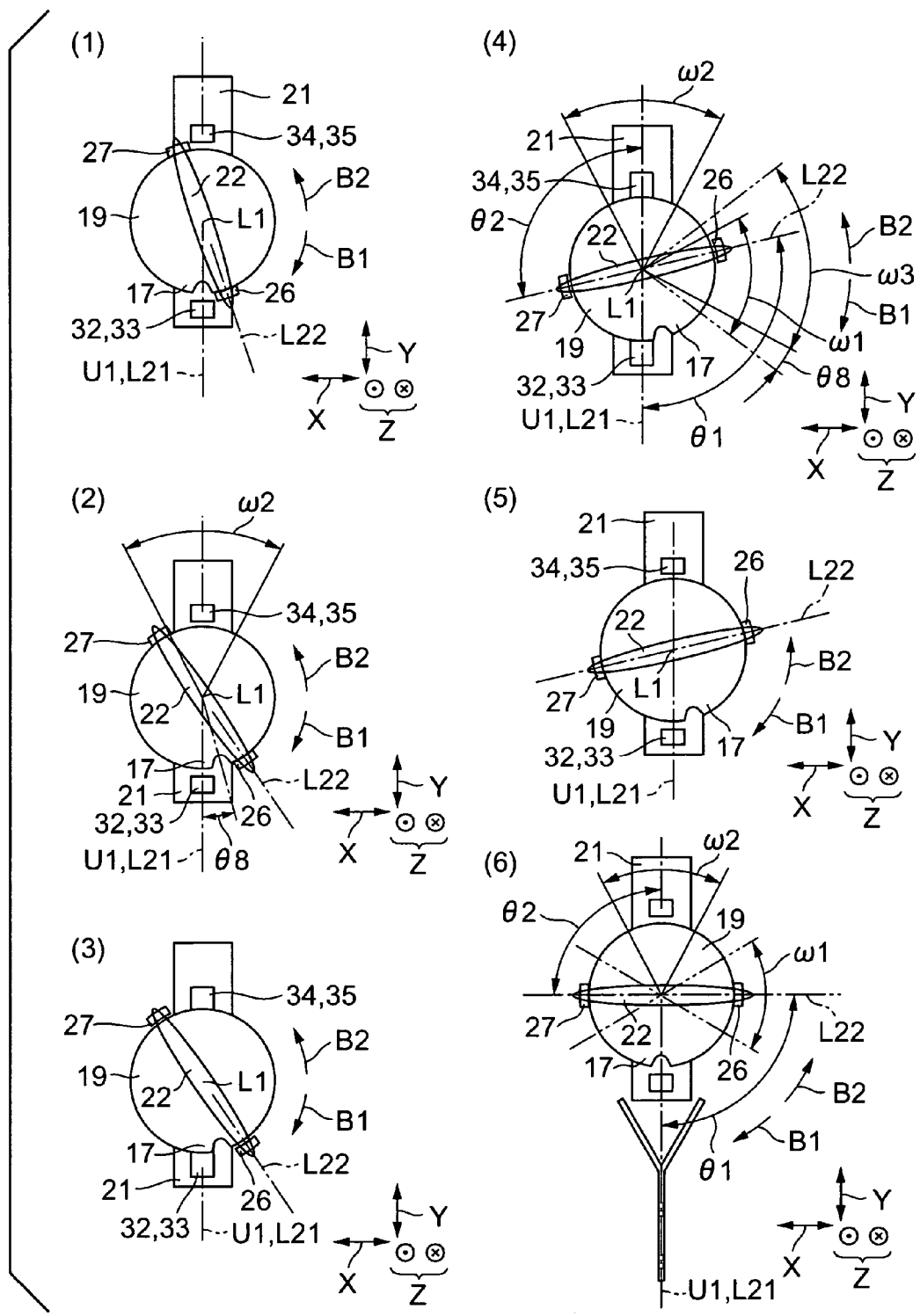
FIG. 27 is a plan view of assistance in explaining steps of the third position adjusting procedure.

FIG. 26 is a flow chart of the third position adjusting procedure and FIG. 27 is a plan view of assistance in explaining the third position adjusting procedure. The controller 38 decides that the third position adjusting procedure needs to be conducted in step c0, and the third position adjusting procedure is started in step c1.

In step c1, the rotational arm 22 is turned for angular displacement to position the rotational arm 22 such that the rotational arm 22 will not interfere with the shifting arms 32 to 35 when the wafer 19 is transferred from the rotational arm 22 to the shifting arms 32 to 35. Then, in step c2, the rotational arm 22 is turned for angular displacement to turn the notch 17 from the reference angular position through a predetermined second angle θ8.

As shown in FIG. 25, the predetermined second angle θ8 is not smaller than an angle θ9 between the arm axis L22 and a line demarcating the shifting arm interference angular range ω2 in a state where the notch 17 is at the reference angular position. The rotational arm 22 is turned in the circumferential direction B2 from an angular position shown in FIG. 27(1) to an angular position shown in FIG. 27(2).

In step c2, operations similar to those executed in steps b3 and b4 are performed to transfer the wafer 19 from the rotational arm 22 to the shifting arms 32 to 35 as shown in FIG. 27(3) and then the third position adjusting procedure goes to step c3.

In step c3, the rotational arm 22 is turned in the circumferential direction B2 so that the angle θ2 between the arm axis L22 and the base axis L21 is not within the shifting arm interference angular range ω2 and the angle θ1 between the arm axis L22 and the robot path U2 is within the robot hand noninterference angular range ω1 as shown in FIG. 27(4). More precisely, the angle θ1 between the arm axis L22 and the robot path U1 is in an angular range ω3 at a predetermined second angle θ8 from the robot hand noninterference angular range ω1.

In step c4, operations similar to those performed in steps b6 and b7 are performed to transfer the wafer 19 from the rotational arm 22 to the shifting arms 32 to 35 as shown in FIG. 27(5), and then step c5 is executed. In step c5 the rotational arm 22 is turned through the predetermined second angle θ8 in the circumferential direction B1. Consequently, the angle θ1 between the arm axis L22 and the robot path U1 can be included in the robot hand noninterference angular range ω1 with the notch 17 positioned at the reference angular position.

When the notch 17 cannot be positioned at the reference angular position by a single cycle of the position adjusting procedure, the angle θ1 between the arm axis L22 and the robot path U1 can be shifted to the robot hand noninterference angular range ω1 by displacing the notch 17 gradually relative to the rotational arm 22 and repeating steps c1 to c5 several times.

Even if the rotational arm 22 interferes with the robot hand 18, the rotational arm 22 can be moved to a position where the rotational arm 22 does not interfere with the robot hand 18 with the notch positioned at the reference angular position by operations using the shifting arms 32 to 35 like those performed by the second or the third position adjusting procedure. Even if the notch 17 is formed at an optional position on the edge 16, the wafer 19 can be carried by the robot hand 18 after the positional adjustment of the wafer 19.

The controller 38 executes one of the first, the second and the third position adjusting procedure to achieve transferring the wafer 19 adjusted to the position to the robot hand 18 regardless of the position of the notch 17 and the advancing direction of the robot hand 18. When the positional adjustment of the wafer 19 can be completed by a single cycle of the position adjusting operation, the predetermined second angle θ8 is not smaller than the angle θ9 between the arm axis L22 in a state where the notch 17 is at the reference angular position and a line demarcating the shifting arm interference angular range ω2. It is preferable that the second angle θ8 is the smallest necessary angle. When the second angle θ8 is small, the angular displacement of the rotational arm 22 in steps c1 and c5 is small and time necessary for the positional adjustment can be reduced.

Although the rotational arm 22 is turned through −5° upon the detection of the notch 17 by the first notch detecting operation in step a1 in this embodiment, the angular displacement of the rotational arm 22 is not limited to −5°. For example, after the detection of the notch 17 by the first notch detecting operation, the wafer 19 may be held by the rotational arm 22 after turning the rotational arm 22 to an angular position in the transfer-permissible range in which the rotational arm 22 does not interfere with the robot hand 18 with the notch 17 held at the reference angular position. In other words, the rotational arm 22 is turned through an angle on the basis of the orientation of the notch 17 and the shape of the robot hand 18 for carrying the wafer 19 such that the rotational arm 22 holds the wafer 19 at an angular position that makes the frequency of a shifting operation for shifting the wafer 19 by the shifting arms 32 to 35 is small when the shifting arms 32 to 35 shift the wafer 19.

The controller 38 is able to store data on the robot path U1 and the robot hand noninterference angular range ω1 and to locate the rotational arm 22 at a transfer-permissible position where the wafer 19 can be transferred to the robot hand 18 on the basis of the angular position of the notch 17 determined by the first notch detecting operation and the stored data.

Thus the interference between the robot hand 18 and the rotational arm 22 can be avoided in a state where the notch 17 is positioned at the reference angular position. If the robot hand 18 and the rotational arm 22 interfere with each other, the angular position of the wafer 19 on the rotational arm 22 needs to be changed. However, the possibility of occurrence of a condition requiring changing the angular position of the wafer 19 can be reduced to the least extent by holding the wafer 19 after the rotational arm 22 has been positioned so as to avoid interference between the robot hand 18 and the rotational arm 22 and thereby time for handling the wafer 19 can be reduced.

Similarly, after the detection of the notch 17 by the first notch detecting operation, the wafer 19 may be held by the rotational arm 22 after adjusting the angular position of the rotational arm 22 so that the rotational arm 22 is in an angular range in which the rotational arm 22 may not interfere with the shifting arms 32 to 35, namely, a non interference angular range, in a state where the notch 17 is positioned at the reference angular position. The controller 38 may store data on the robot patch U1, the robot hand noninterference angular range ω1 and the shifting arm interference angular range ω2 beforehand, and may position the rotational arm 22 in the noninterference angular range on the basis of the angular position of the notch 17 determined by the first notch detecting operation and the stored data.

Thus interference between the rotational arm 22 and the shifting arms 32 to 35 can be avoided when the wafer 19 needs to be transferred from the rotational arm 22 to the shifting arms 32 to 35 to position the notch 17 at the reference angular position. The possibility of occurrence of a condition requiring changing the angular position of the wafer 19 can be reduced. Consequently, the frequency of the shifting operation can be further reduced and time necessary for the operation for adjusting the position of the wafer 19 can be further reduced.

When the rotational arm 22 is held at the position where the rotational arm 22 does not interfere with the robot hand 18 with the notch 17 positioned at the reference angular position, and when the rotational arm 22 is held at the position where the rotational arm 22 does not interfere with the shifting arms 32 to 35, it is preferable to increase the angle θ3 through which the rotational arm 22 is turned and to search the widest possible range in the edge of the wafer 19 for the notch. Thus the frequency of the shifting operation can be further reduced.

Figure 28:
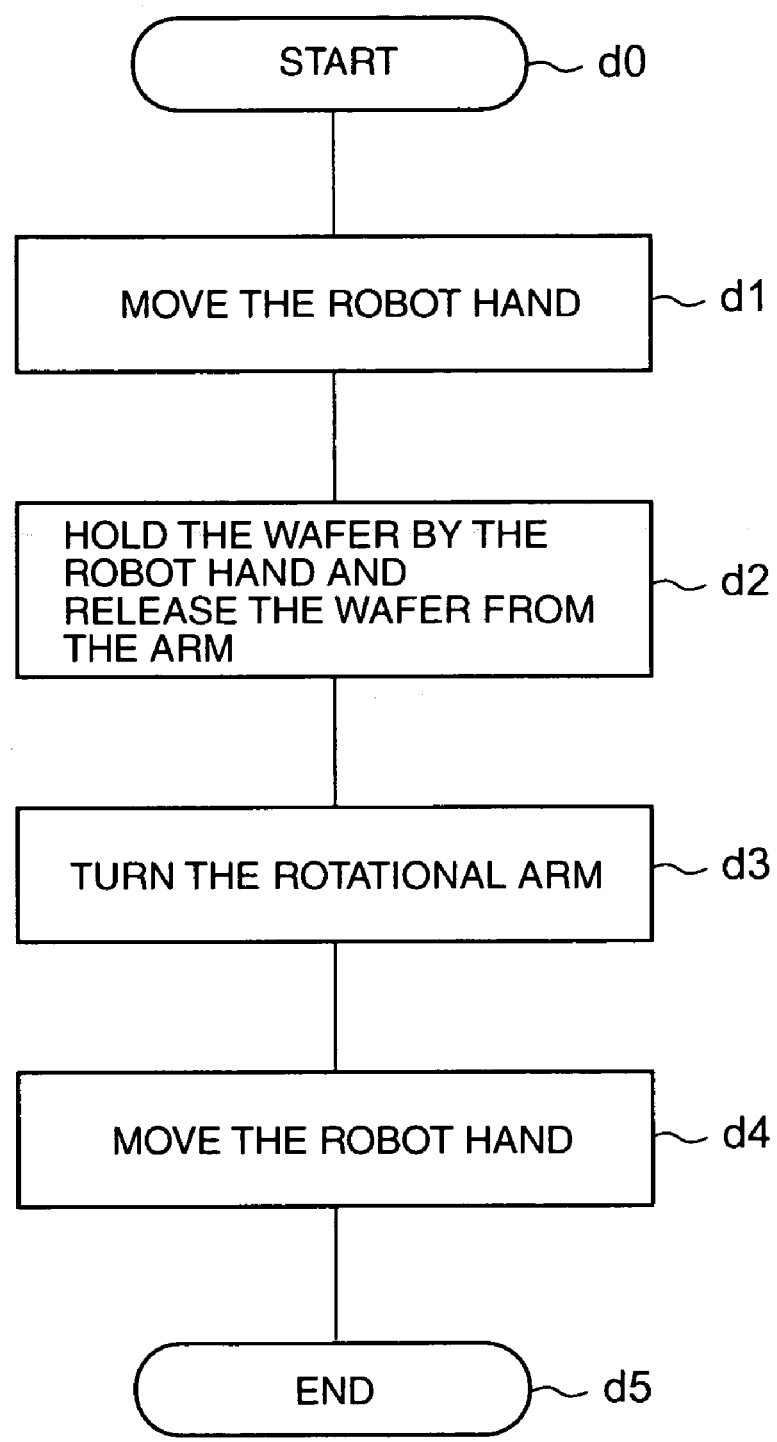
FIG. 28 is a flow chart of a transfer procedure for transferring a wafer 19 to a robot hand.
Figure 29:
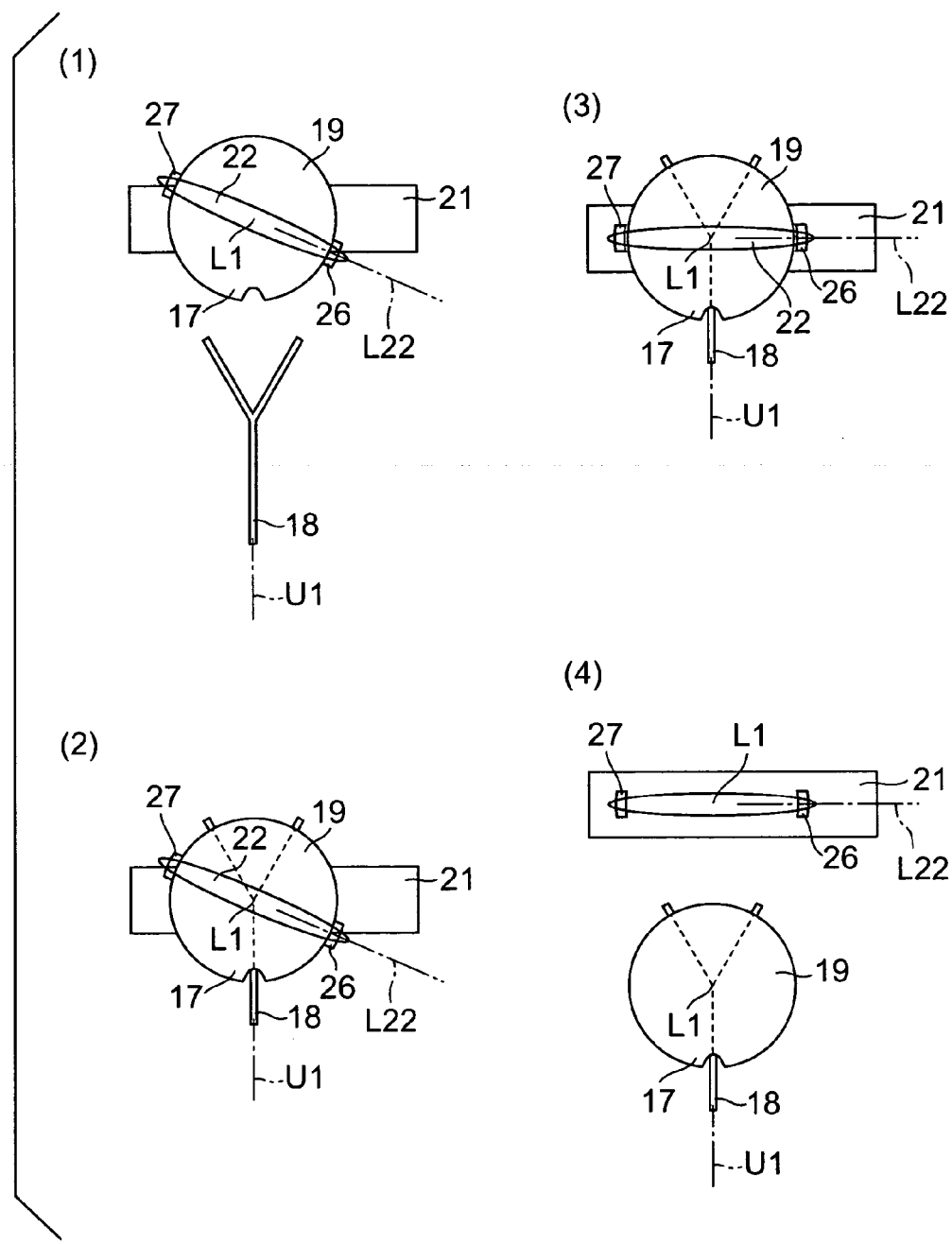
FIG. 29 is a plan view of assistance in explaining the transfer procedure for transferring the wafer 19 to the robot hand.

FIG. 28 is a flow chart of a transfer procedure for transferring the wafer 19 to the robot hand 18 and FIG. 29 is a plan view of assistance in explaining the transfer procedure for transferring the wafer 19 to the robot hand 18.

The controller 38 executes one of the first, the second and the third position adjusting operation. The notch 17 is positioned at the reference angular position in step d0 as shown in FIG. 29(1), and the controller 38 gives the robot hand driving device 39 an operation start command in step d1 to tart the transfer operation. Then, the robot hand 18 advances into the space between the wafer 19 and the arm body 100 to a predetermined position taught beforehand thereto.

Upon the arrival of the robot hand 18 at the position taught thereto as shown in FIG. 29(2), the robot hand driving device 39 gives the controller 38 a taught position arrival signal.

Then, in step d2, an exhaust command signal is given to the solenoid valve 60 of the holder driving device 40 to set the holders 26 and 27 in a displaceable state in which the holders 26 and 27 can be moved by external force, and an operation start command signal is given to the robot hand driving device 39. Then, the robot hand driving device 39 drives the plunger of the robot hand 18 to hold the wafer 19 between the shifters of the robot hand 18. Then, the holders 26 and 27 are moved in outward radial directions A to transfer the wafer 19 to the robot hand 18, and the transfer procedure goes to step d3.

Since the wafer 19 can be moved by external force when the holders 26 and 27 are set in the displaceable state in step d2, the wafer 19 will not be damaged when the plunger of the robot hand 18 is operated to hold the wafer 19 between the shifters.

In step d3, the rotational arm 22 is turned for angular displacement to a position where the arm axis L22 is perpendicular to the robot path U1 as shown in FIG. 29(3). Then in step d4, a transfer completion signal is given to the robot hand driving device 39. The robot hand driving device 39 performs operations previously taught thereto as shown in FIG. 29(4). The transfer procedure is ended in step d5.

Interference of the rotational arm 22 with the wafer 19 is avoided and the robot hand 18 can be withdrawn from the aligner 20 by turning the rotational arm 22 to the position where the arm axis L22 is perpendicular to the robot path U1 in step d3 after the wafer 19 has been transferred to the robot hand 18. The rotational arm 22 can be disposed at its home position and the next position adjusting operation for adjusting the position of a wafer can be smoothly carried out. The encoder 25 uses an angular position of the rotational arm 22 at the connection of the rotational arm 22 to the power supply as a home angular position, and gives the controller 38 an angular position signal indicating an angular position at an angle from the home angular position. The controller gives the rotational arm driving device 36 a test command signal after the connection of the aligner 20 to the power supply to test angular position.

The aligner 20 is provided with a testing sensor for testing the angular position of the rotational arm 22. The testing sensor provides a detection signal when the rotational arm 22 is positioned at a known angular position at an angle from a predetermined set angular position. The set angular position is the reference angular position from which the angular displacement of the rotational arm 22 is reckoned.

Upon the reception of the test command signal, the rotational arm driving device 36 turns the rotational arm 22 at a low angular velocity in a predetermined circumferential direction B. The controller 38 receives a detection signal from the testing sensor upon the arrival of the rotational arm 22 at the known angular position at an angle from the set angular position.

Upon the reception of the detection signal, the controller 38 reads the angular displacement of the rotational arm 22 from the home angular position, determines an angular difference between the home angular position and the set angular position, and determines a correction for correcting the angular difference. The controller 38 is able to determine an angular displacement of the rotational arm 22 from the set angular position, namely, the reference angular position, on the basis of the angular displacement measured by the encoder 25 and the correction.

For example, an angular position of the rotational arm 22 at the moment the controller 38 received the detection signal is a set angular position at 390° from the set angular position in the second circumferential direction, i.e., at −390° in the first circumferential direction. After the detection, the controller 38 turns the rotational arm 22 mechanically in an angular range of ±360° from the set angular position. If the testing sensor has provided a detection signal before the connection of the aligner 20 to the power supply, the rotational arm is turned through a predetermined angle in the second circumferential direction and then the rotational arm 22 is turned at a low angular velocity in the first circumferential direction.

An initial position is determined to improve positioning accuracy. The initial position is determined by turning the rotational arm 22 for angular displacement after performing the foregoing method, a position of the rotational arm 22 where the light receiving mode of the first notch detector 23 is caused to start changing from a normal light receiving condition and a position of the rotational arm 22 where the light receiving mode of the first notch detector 23 is restored to the normal light receiving condition are determined, and the middle position between those positions is determined as the initial position. Then, a correction for determining the initial position is determined. When the rotational arm 22 is positioned at the initial position, the arm axis L22 is aligned with the base axis L21.

Figure 30:
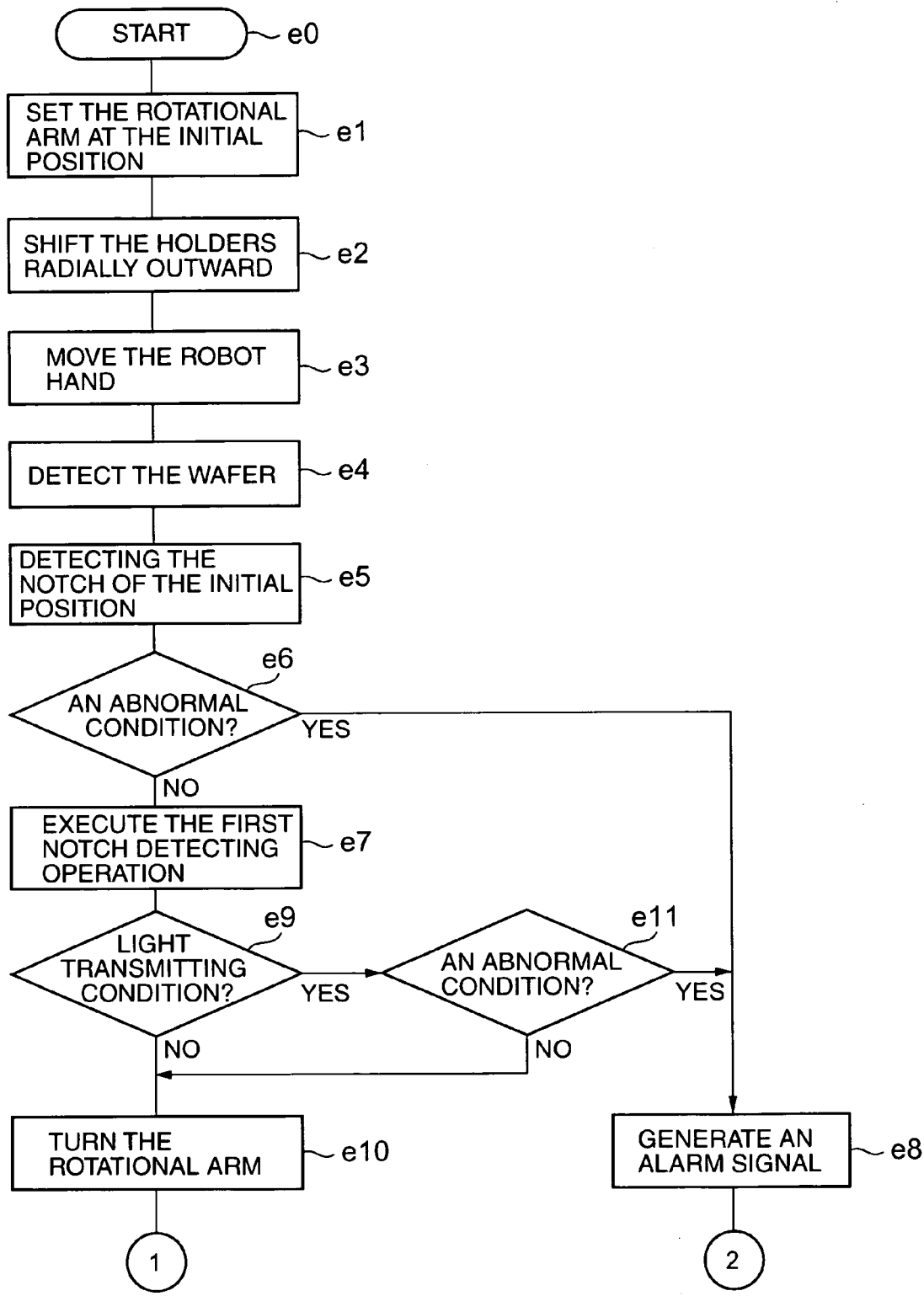
FIG. 30 is a flow chart of a position adjusting procedure to be carried out by the controller 38.
Figure 31:
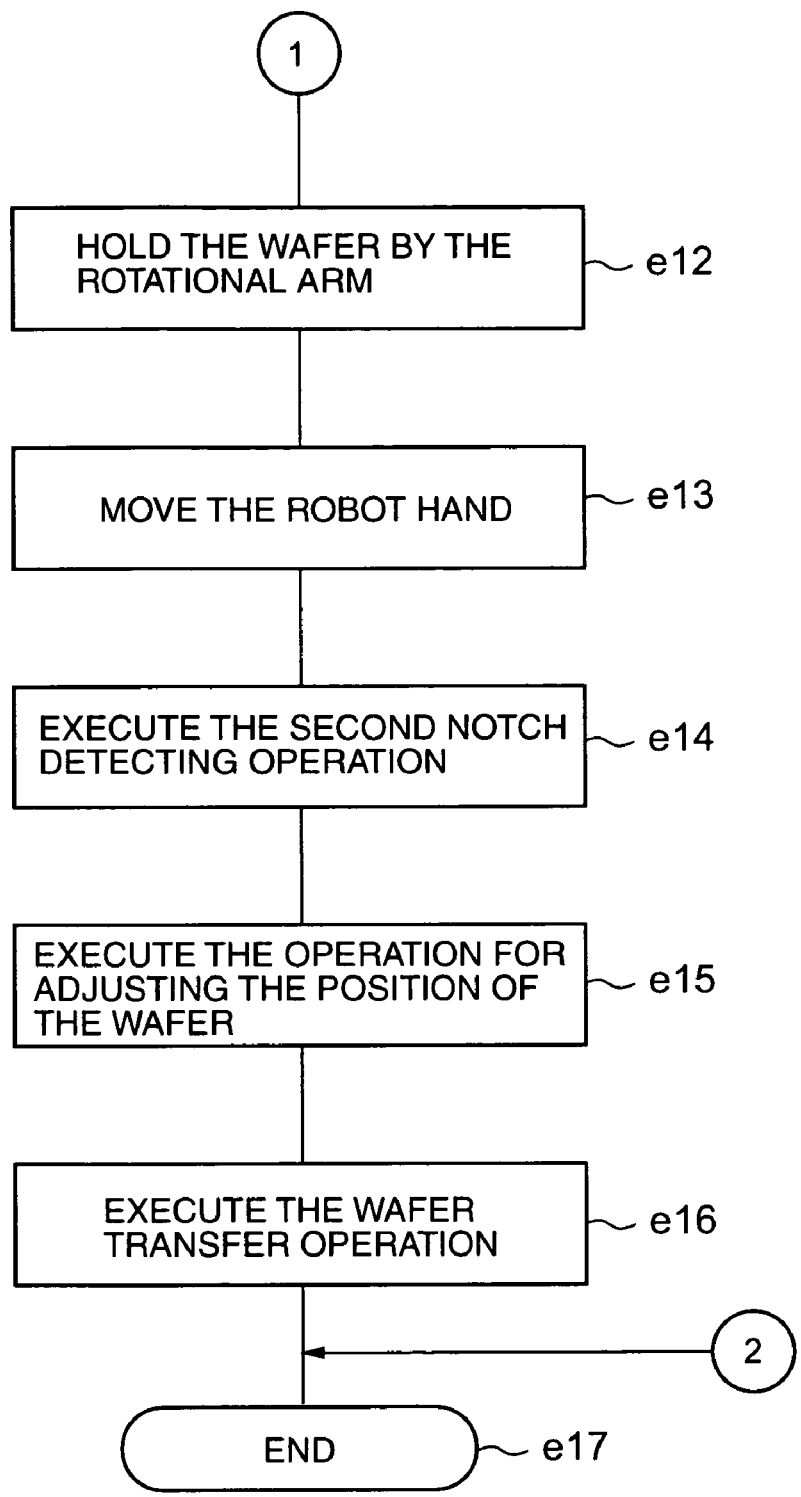
FIG. 31 is a flow chart of the position adjusting procedure to be carried out by the controller 38.

FIGS. 30 and 31 are flow charts of a position adjusting procedure to be carried out by the controller 38. The controller 38 starts the position adjusting procedure in step e0 after the positional adjustment of the wafer 19 has been completed.

In step e1, the rotational arm 22 is set at the initial position. More concretely, the rotational arm 22 is set with the arm axis L22 extended at 90° or −90° to the robot path U1 depending on the position of the angular position of the rotational arm 22 before the rotational arm 22 is turned to the initial position. The rotational arm 22 is not turned a plurality of full turns in step e1 and hence the cables extending between the arm body 100 and the base 21 will not be twisted off.

Then, in step e2, the holder driving device 40 is actuated to move the holders 26 and 27 in the outward radial directions A to provide a space for the wafer 19. Then, a wafer carrying command is given to the robot hand driving device 39 in step e3.

Then, the robot hand 18 holding the wafer 19 carries the wafer 19 and places the wafer 19 in the space between the holders 26 and 27 coaxially with the pivotal axis L1 and the controller 38 detects the wafer 19 disposed coaxially with the pivotal axis L1 in step e4. Then, in step e5, the second notch detectors 24a and 24b are actuated and the light receiving condition of the light receives 106 are examined. The first notch detector 23 may be also actuated in step e5.

Then, in step e6, it is decided that the wafer 19 is disposed at a normal position if the light receivers 106 of both the second notch detectors 24a and 24b do not receive the light beams projected by the light projectors 105 and the position adjusting procedure goes to step e7. If the light receiver 106 of the second notch detector 24a does not receive the light beam and the light receiver 106 of the second notch detector 24b receives the light beam, it is decided that the notch 17 is opposite to the second notch detector 24b and that the wafer 19 is disposed at the normal position and the position adjusting procedure goes to step e7.

If the light receivers 106 of both the notch detectors 24a and 24b receive the light beams, step e8 is executed to make the alarm device generate an alarm signal indicating an abnormal condition, and then the position adjusting procedure goes to step e17. The controller ends the position adjusting procedure in step e17. The position of the notch 17 and the abnormal disposition of the wafer 19 can be more accurately determined by using the first notch detector 23 in combination with the second notch detectors 24a and 24b in step e6.

If it is decided that the wafer 19 is at the normal position in step e6, the rotational arm 22 is turned through a predetermined angle of, for example 10° in step e7, and then the position adjusting procedure goes to step e9.

It is decided in step e9 that the notch 17 is not in regions corresponding to the second notch detectors 24a and 24b if the light receivers 106 of both the second notch detectors 24a and 24b do not receive any light beam, and then the position adjusting procedure goes to step e10. The rotational arm 22 is turned for angular displacement such that the holders 26 and 27 are opposed to edge regions not including the notch 17 in step e10, and then the position adjusting procedure goes to step e12.

The position adjusting procedure goes to step e11 if it is decided in step e9 that the light receiver 106 of the second notch detector 24a does not receive any light beam and the light receiver 106 of the other second notch detector 24b receives the light beam while the rotational arm 22 is being turned in step e7.

When it is decided in step e9 that the circumferential angular range of the rotational arm 22 is a circumferential angular range corresponding to the notch, it is decided in step e11 that the notch 17 corresponds to the second notch detector 24b in a light receiving condition and the position adjusting procedure goes to step e10. The rotational arm 22 is turned for angular displacement in step e10 to dispose the holders 26 and 27 opposite to edge regions not including the notch 17, and then the position adjusting procedure goes to step e12.

If it is decided in step e11 that the circumferential angular range of the rotational arm 22 is not a circumferential angular range corresponding to the notch in a light receiving condition, an alarm indicating an abnormal condition is generated in step e8, and then the controller 38 ends the position adjusting procedure in step e17.

Figure 32:
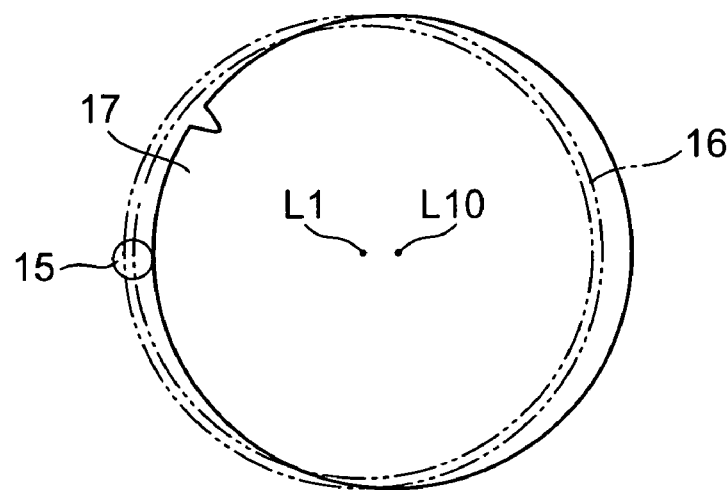
FIG. 32 is a plan view of the wafer 19 disposed with its axis L10 not aligned with the pivotal axis L1.
Figure 33:
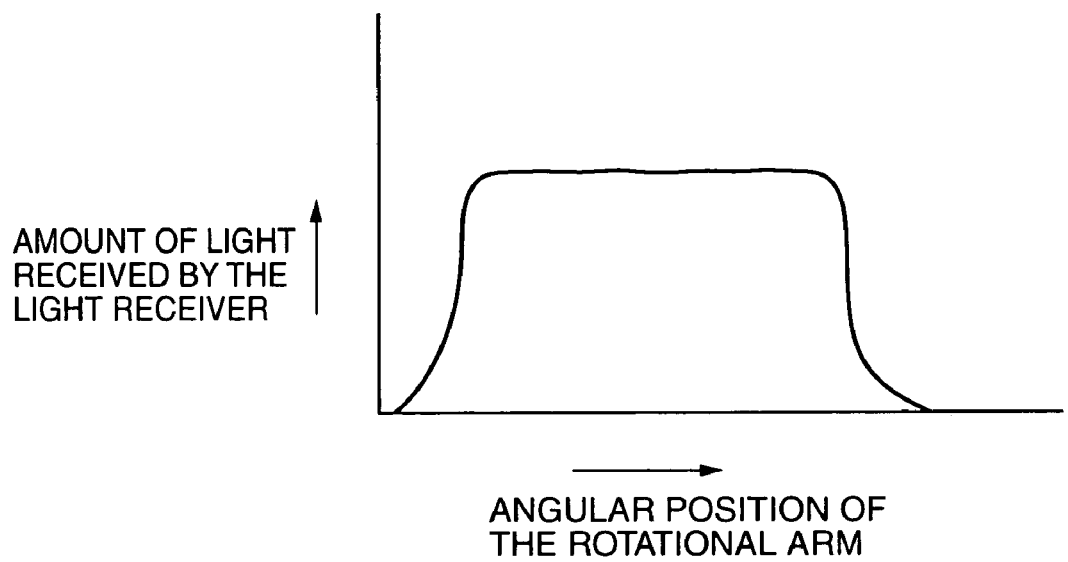
FIG. 33 is a graph showing the relation between the amount of light received by the light receiver and the angular position of the rotational arm in a state shown in FIG. 32.

FIG. 32 is a plan view of the wafer 19 disposed with its axis L10 not aligned with the pivotal axis L1 and FIG. 33 is a graph showing the relation between the amount of light received by the light receiver and the angular position of the rotational arm 22 in a state shown in FIG. 32. When the wafer 19 is dislocated with respect to the pivotal axis L1, a circumferential angular range in which the rotational arm 22 turns while the light receiver 106 of either of the second notch detectors 24 is able to receive the light beam projected by the corresponding light projector 105 expands. The amount of light received by the light receiver 106 of the second notch detector 24 when the wafer 19 is chipped or the diameter of the wafer 19 is different from a desired diameter is different from the amount of light received by the light receiver 106 in the normal condition.

In step e12, the rotational arm 22 holds the wafer 19. More concretely, a release command is give to the robot hand 18 to release the wafer 19 by retracting the plunger of the robot hand driving device 39 from the wafer 19. Consequently, the wafer 19 is supported on the robot hand 18 and the wafer 19 can be radially displaced by external force.

Then, the controller 38 controls the holder driving device 40 to move the holders 26 and 27 in the inward radial directions A to hold the wafer 19 between the holders 26 and 27, and then the position adjusting procedure goes to step e13. The wafer 19 held between the holders 26 and 27 after being released form the robot hand 18 can be displaced by external force. Thus the wafer 19 held by the holders 26 and 27 is prevented from being damaged.

In step e13, a robot hand retraction command is given to the robot hand driving device 39 to retract the robot hand 18 from the aligner 20. Step e14 is executed after the robot hand 18 has been retracted from the aligner 20 to a waiting position. In step e14, the rotational arm 22 is turned fully one turn at the maximum. While the rotational arm 22 is thus being turned, the first notch detector 23 is actuated to examine the angular position of the rotational arm 22 and the light receiving condition of the light receiver 111. The controller 38 determines the angular position of the notch 17.

Then, in step e15, one of the first, the second and the third position adjusting operation is executed on the basis of the angular position of the notch 17 determined in step e14, the robot path U1, the robot hand noninterference angular range ω1 and the shifting arm interference angular range ω2. Then, in step e16, a wafer transfer operation shown in step e16 in FIG. 31 is executed, and the control operation of the controller 38 for controlling the position adjusting procedure is ended in step e17.

The aligner 20 in the preferred embodiment of the present invention is provided with the two holders 26 and 27 point-symmetrical with respect to the pivotal axis L1. Since the holders 26 and 27 can be space a long distance apart, the possibility of interference between the rotational arm 22 and the robot hand 18 can be reduced. Accordingly, a range in which the wafer 19 can be transferred from the rotational arm 22 to the robot hand 18 without changing the position of the wafer 19 relative to the rotational arm 22 can be expanded. Consequently, the possibility of dislocating the wafer 19 after positional adjustment can be reduced and the construction of the aligner 20 can be simplified.

As shown in FIG. 4, opposite side parts 95 and 96 of the holders 26 and 27 come into contact with the edge 16. Thus the two holders 26 and 27 are able to hold the wafer 19 securely. Since the holders 26 and 27 are pressed against the wafer 19 in opposite directions, respectively, the wafer 19 can be more securely held between the holders 26 and 27 and hence the wafer 19 is prevented from dislocating from the normal position during the turning of the rotational arm 22 for angular displacement. Even if the wafer 19 is not correctly positioned relative to the robot hand 18 when the wafer 19 is transferred from the robot hand 18 to the rotational arm 22, the wafer 19 can be disposed correctly in alignment with the pivotal axis L1.

As shown in FIGS. 19, 23 and 24, the possibility of the rotational arm 22 being positioned at an angular position in the shifting arm interference angular range ω2 when the rotational arm 22 is at an angular position outside the robot hand noninterference angular range ω1 by adjusting the position of the aligner 20 such that the robot arm 18 advances in a direction substantially perpendicular to the base axis L21 and, consequently, the frequency of the shifting operation can be reduced.

As shown in FIG. 5, the straight line 94 connecting points on the shifters 28 to 31 touching the edge of the wafer 19 and the axis L2 is parallel to the pivotal axis L1; that is, the straight line 94 is parallel to a radius of the wafer 19. The shifters 28 to 31 are turned by the torques of the turning shafts 54 about the axes L2 and L3 to apply pressure to the edge 16 toward the pivotal axis L1.

As mentioned above, the shifters 28 to 31 apply forces only in the radial directions A to the wafer 19 because the straight line 94 connecting the axis L2 and the shifters 28 to 31 is parallel to the pivotal axis L1. Consequently, the shifters 28 to 31 do not apply any force on the wafer 19 in a direction along the thickness of the wafer 19 and hence the wafer 19 will not be damaged when the same is held by the shifters 28 to 31.

The shifters 28 to 31 must be held at positions where the shifters 28 to 31 will not interfere with the rotational arm 22 when the shifters 28 to 31 are retracted from the edge 16. If, for example, the shifters 28 to 31 are to be brought into contact with the edge 16 by linearly moving the shifters 28 to 31 in the radial directions A, the shifters 28 to 31 need to be moved a long distance to their waiting position, which increases the dimensions of the aligner 20. Since the holding embers 28 to 31 are turned about the axels L2 and L3, respectively toward and away from the edge 16, the distance for which the shifters 28 to 31 are moved by turning the shifters 28 to 31 is shorter than the distance for which the shifters 28 to 31 are to be moved straight in the radial directions A to move the shifters 28 to 31 toward and away from the edge 16 and hence the aligner 20 can be formed in a small size.

If the shifter 28 is turned simply for angular displacement, it is possible that the shifter 28 applies force to the wafer 19 in the direction of the thickness of the wafer 19. Since the straight line 94 connecting the shifters 28 to 31 and the axis L2 is parallel to the pivotal axis L1, any force will not be applied to the wafer 19 in the direction of the thickness of the wafer 19 when the shifters 28 to 31 holds the wafer 19.

In this embodiment, the holders 26 and 27 are drive for a coordinate operation by compressed air supplied from the single pump to the pneumatic cylinder. Since air is compressible, even if only the holder 26 (27) comes into contact first with the wafer 19, the holder 26 will not be excessively strongly pressed against the wafer 19. Since the same pressure of the compressed air works for operating the holders 26 and 27, the forces applied to the wafer 19 by the holders 26 and 27 balance each other and hence the wafer 19 can be held coaxially with the pivotal axis L1.

Since the shifting arms 32 to 35 are driven for coordinate operations by the compressed air supplied from the single pump, the shifting arms 32 to 35 are able to exercise the same effect as the holders 26 and 27.

When the controller 38 is able to control the robot hand driving device 39, the controller 38 may determine the deviation of the axis L10 of the wafer 19 held by the robot hand 18 from the pivotal axis L1 on the basis of signals provided by the two second notch detectors 24a and 24b and the first notch detector 23 in step e11 and the controller 38 may correct the position taught to the robot hand 18. When the controller 38 corrects the position taught to the robot hand 18, the operator does not need to teach an accurate position to the robot hand 18 and hence the teaching operation can be completed in a short time and the convenience of the aligner 20 is improved. It is also possible to prevent failure in gripping the wafer 19.

The aligner 20 in the preferred embodiment of the present invention is only an example of the present invention and changes may be made therein without departing from the scope of the present invention. For example, although the notch 17 is used as an orientation indicator for indicating a reference angular position, any suitable orientation indicator other than the notch 17 may be used. For example, an orientation flat formed in the wafer 19 may be used for adjusting the position of the wafer 19 instead of the notch 17. The edge-holding aligner 20 may be used for adjusting the position of substrates other than wafers 19. For example, the edge-holding aligner 20 may be used for adjusting the position of a disk-shaped glass substrate.

The rotational arm driving device 36, the shifting arm driving device 37 and the holder driving device 40 may be any suitable driving device other than those driving devices employed in this embodiment, provided that the driving devices are capable of driving the rotational arm 22, the shifting arms 32 to 35 and the holders 26 and 27, respectively. For example, the shifting arm driving device 37 and the holder driving device 40 may employ electric motors instead of the pneumatic cylinders. The notch detectors 23, 24a and 24b may use any suitable devices other than the optical devices using the optical fibers. Although the invention has been described on an assumption that the pivotal axis L1 is vertical, the pivotal axis L1 may be extended in any suitable direction. If the pivotal axis L1 is not vertical, the height is not a vertical dimension. The base axis L21 does not need necessarily perpendicular to the robot path U1. The foregoing control operations executed by the controller 38 are only examples and the controller 38 may control the aligner 20 of the present invention by other control operations.

Although the invention has been described in its preferred embodiment, the technical scope of the present invention is not limited by the embodiment specifically described herein and various changes and variations are possible therein. It is obvious from the appended claims that edge-holding aligners including the foregoing changes and improvements fall within the technical scope of the present invention.

What is claimed is:

1. An edge-holding aligner for detecting an orientation indicator formed in an edge of a disk-shaped substrate, adjusting a position of the substrate based on a detection result of the orientation indicator, and then holding the substrate, comprising:

a base;

a rotational arm supported on the base so as to be able to turn for angular displacement about a predetermined pivotal axis, the rotational arm being provided with a holder for holding an edge of the substrate in a state that an axis of the substrate is aligned with the pivotal axis;

rotational arm driving means for driving the rotational arm for angular displacement about the pivotal axis;

holder driving means for driving the holder for radial displacement along a radius of an imaginary circle having a center on the pivotal axis;

first orientation indicator detecting means for detecting the orientation indicator, the first orientation indicator detecting means being mounted on the base so as to correspond to a path along which the edge of the substrate moves;

second orientation indicator detecting means for detecting the orientation indicator, the second orientation indicator detecting means being mounted on the rotational arm so as to correspond to a path along which the edge of the substrate moves;

angular position detecting means for detecting an angular position of the rotational arm about the pivotal axis; and control means for controlling the rotational arm driving means to turn the rotational arm for angular displacement, determining a position of the orientation indicator based on detected data provided by the second orientation indicator detecting means and the angular position detecting means while the rotational arm is being turned for angular displacement, controlling the rotational arm driving means to turn the rotational arm through an angle such that the holder and the orientation indicator are displaced circumferentially relative to each other.

2. The edge-holding aligner according to claim 1, wherein the control means controls, in a state that the orientation indicator is positioned at a predetermined reference angular position, the rotational arm driving means to turn the rotational arm for angular displacement before the holder holds the substrate such that the rotational arm is positioned at a position in a transfer-permissible range in which the substrate can be transferred to another substrate carrying device and vice versa.

3. The edge-holding aligner according to claim 1 further comprising:

a shifting arm provided with a shifter for receiving the substrate from the holder and returning the substrate to the holder so as to permit the rotational arm to turn for angular displacement after the substrate has been transferred from the holder to the shifter; and shifting arm driving means for driving the shifting arm to displace.

4. The edge-holding aligner according to claim 3, wherein the control means controls, in a state that the orientation indicator is positioned at a predetermined reference angular position, the rotational arm driving means to turn the rotational arm for angular displacement before the holder holds the substrate such that the rotational arm is positioned at a position in a noninterference range in which the rotational arm does not interfere with the shifting arm.

5. The edge-holding aligner according to claim 1, wherein the rotational arm is provided with a plurality of holders, the holders being pressed against the substrate in diametrically opposite directions, respectively, to hold the substrate.

6. The edge-holding aligner according to claim 1 further comprising positional difference calculating means for calculating a positional difference of the substrate from a predetermined position based on the position of the orientation indicator detected by the first orientation indicator detecting means and the second orientation indicator detecting means.

7. A substrate positioning system comprising:

the edge-holding aligner according to claim 6; and a substrate carrying device for carrying a substrate to the edge-holding aligner;

wherein the substrate carrying device corrects the position of the substrate based on the positional difference of the substrate calculated by the positional difference calculating means.

8. An edge-holding aligner for detecting an orientation indicator formed in an edge of a disk-shaped substrate, adjusting a position of the substrate based on a detected result of the orientation indicator, and then holding the substrate, comprising:

a base;

a rotational arm supported on the base so as to be able to turn for angular displacement about a predetermined pivotal axis, the rotational arm being provided with two holders disposed point-symmetrically with respect to the pivotal axis and capable of supporting an edge of the substrate from one direction along thickness of the substrate in a state that an axis of the substrate is aligned with the pivotal axis;

rotational arm driving means for driving the rotational arm for angular displacement about the pivotal axis;

holder driving means for driving the holders for radial displacement along radii of an imaginary circle having a center on the pivotal axis;

first orientation indicator detecting means for detecting the orientation indicator, the first orientation indicator detecting means being mounted on the base so as to correspond to a path along which the edge of the substrate moves;

angular position detecting means for detecting an angular position of the rotational arm about the pivotal axis;

a shifting arm provided with a shifter for receiving the substrate from the holders and returning the substrate to the holders so as to permit the rotational arm to turn for angular displacement after the substrate has been transferred from the holders to the shifter; and shifting arm driving means for driving the shifting arm to displace.

9. The edge-holding aligner according to claim 8, wherein the holders come into contact with the substrate on opposite sides of an imaginary plane containing the pivotal axis, respectively, and hold the substrate cooperatively between the holders.

10. The edge-holding aligner according to claim 8, wherein a plurality of shifters are provided so that the shifters cooperatively hold the substrate between the shifters.

11. The edge-holding aligner according to claim 10, wherein the shifting arm turns for angular displacement about an axis of angular displacement perpendicular to the pivotal axis, and a straight line connecting a position where the shifter is in touch with the edge of the substrate and the axis of angular displacement in an imaginary plane perpendicular to the axis of angular displacement is parallel to the pivotal axis.

12. The edge-holding aligner according to claim 10, wherein the shifting arm driving means includes pneumatic cylinders which are operated coordinately by compressed air supplied from a single compressed air source.

13. The edge-holding aligner according to claim 8, wherein the rotational arm is turned through an angle based on the orientation indicator and a shape of the substrate carrying device for carrying the substrate to hold the substrate at an angular position such that frequency of shifting operation for shifting the substrate by the shifting arms is made small.

* * * * *